US009372388B2

(12) United States Patent
Matsuo

(10) Patent No.: US 9,372,388 B2
(45) Date of Patent: Jun. 21, 2016

(54) PROJECTION OPTICAL ASSEMBLY WITH MULTIPLE REFRACTIVE OPTICAL SYSTEMS AND RELATED PROJECTOR DEVICE

(75) Inventor: Takahiko Matsuo, Nagano (JP)

(73) Assignee: NITTOH KOGAKU K.K., Nagano (JP)

( * ) Notice: Subject to any disclaimer, the term of this patent is extended or adjusted under 35 U.S.C. 154(b) by 192 days.

(21) Appl. No.: 14/130,719

(22) PCT Filed: Jul. 5, 2012

(86) PCT No.: PCT/JP2012/004384

§ 371 (c)(1), (2), (4) Date: Mar. 31, 2014

(87) PCT Pub. No.: WO2013/005444

PCT Pub. Date: Jan. 10, 2013

(65) Prior Publication Data

US 2014/0204351 A1 Jul. 24, 2014

(30) Foreign Application Priority Data

Jul. 5, 2011 (JP) ................................ 2011-148942

(51) Int. Cl.
*G03B 21/28* (2006.01)
*G02B 13/16* (2006.01)
(Continued)

(52) U.S. Cl.
CPC ................ *G03B 21/28* (2013.01); *G02B 13/16* (2013.01); *G02B 13/18* (2013.01); *G02B 13/22* (2013.01); *G02B 15/163* (2013.01); *G02B 15/20* (2013.01); *G02B 17/08* (2013.01)

(58) Field of Classification Search
CPC ........ G02B 13/16; G02B 13/18; G02B 13/22; G02B 15/20; G02B 17/08; G02B 15/163; G03B 21/28; H04N 5/74
See application file for complete search history.

(56) References Cited

U.S. PATENT DOCUMENTS 5,383,052 A 1/1995 Okazaki et al.
5,414,551 A 5/1995 Okazaki et al.
(Continued)

FOREIGN PATENT DOCUMENTS

EP 1640783 3/2006
EP 1852745 11/2007
(Continued)

OTHER PUBLICATIONS

English Translation, International Preliminary Report on Patentability, PCT/JP2012/004384, filed Jul. 5, 2012, 8 pgs.
(Continued)

*Primary Examiner* — Sultan Chowdhury
*Assistant Examiner* — Danell L Owens
(74) *Attorney, Agent, or Firm* — Thompson Hine LLP

(57) ABSTRACT

There is provided a projection optical system (1) that projects from a first image plane on a reducing side to a second image plane on an enlargement side, including a first refractive optical system (11) that includes eight lenses (L1) to (L8) and forms a first intermediate image (31) on the enlargement side using light that is incident from the reducing side, a second refractive optical system (12) that includes six lenses (L9) to (L14) and forms the first intermediate image (31) on the reducing side into a second intermediate image (32) on the enlargement side, and a first reflective optical system (20) that includes a first reflective surface (21*a*) with positive refractive power that is positioned closer to the enlargement side than the second intermediate image (32).

20 Claims, 11 Drawing Sheets

(51) Int. Cl.

| | |
|---|---|
| ***G02B 13/18*** | (2006.01) |
| ***G02B 13/22*** | (2006.01) |
| ***G02B 15/163*** | (2006.01) |
| ***G02B 15/20*** | (2006.01) |
| ***G02B 17/08*** | (2006.01) |

(56) References Cited

U.S. PATENT DOCUMENTS

| | | | |
|---|---|---|---|
| 2004/0150879 | A1 | 8/2004 | Araki et al. |
| 2004/0156117 | A1 | 8/2004 | Takaura et al. |
| 2004/0174611 | A1 | 9/2004 | Hatakeyama |
| 2006/0126032 | A1 | 6/2006 | Takaura et al. |
| 2008/0037112 | A1 | 2/2008 | Ulrich et al. |
| 2008/0174858 | A1 | 7/2008 | Feldman et al. |
| 2008/0304019 | A1 | 12/2008 | Takaura et al. |
| 2009/0015801 | A1 | 1/2009 | Takaura et al. |
| 2009/0015910 | A1 | 1/2009 | Takaura et al. |
| 2009/0021703 | A1 | 1/2009 | Takaura et al. |
| 2010/0039625 | A1 | 2/2010 | Takaura et al. |
| 2010/0238416 | A1 | 9/2010 | Kuwata et al. |
| 2012/0120484 | A1* | 5/2012 | Konuma ................ G02B 13/16 359/364 |

FOREIGN PATENT DOCUMENTS

| | | |
|---|---|---|
| JP | 05-333269 | 12/1993 |
| JP | 2004-258620 | 9/2004 |
| JP | 2004-295107 | 10/2004 |
| JP | 2010-244017 | 10/2010 |
| JP | 2011-150355 | 8/2011 |
| JP | 2012-108267 | 6/2012 |

OTHER PUBLICATIONS

Supplemental Partial European Search Report dated Feb. 3, 2015, 5 pages.

International Search Report, International Application No. PCT/JP2012/004384 (Aug. 7, 2012).

EP Search Report Application No. 12807709.6-1562/2730961 PCT/JP2012004384; date of mailing Jun. 16, 2015, 8 pages.

* cited by examiner

Fig. 1
(a)
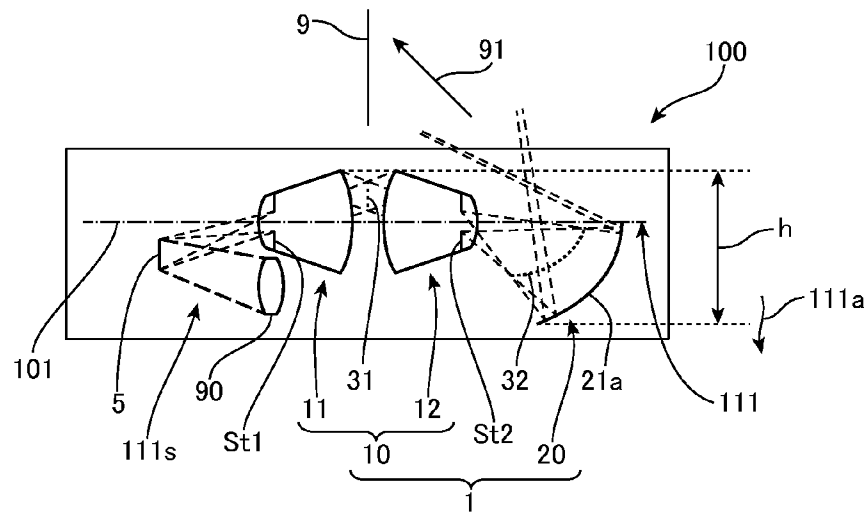
(b)
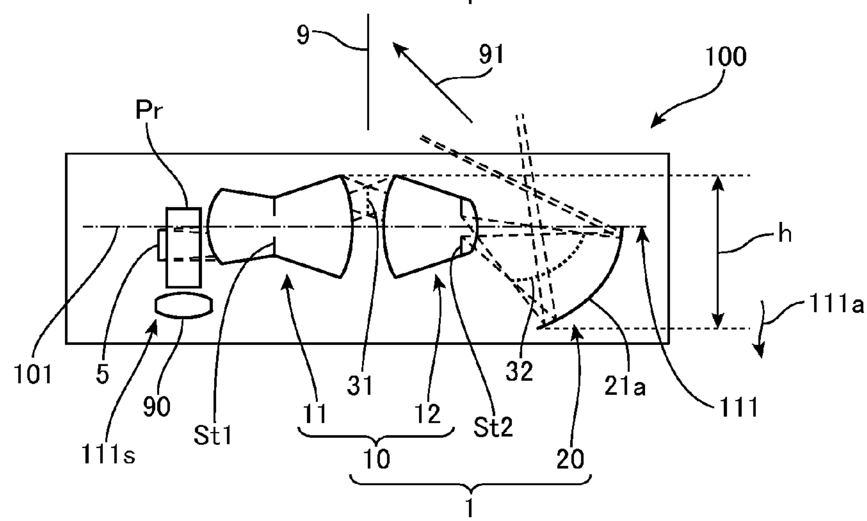
(c)
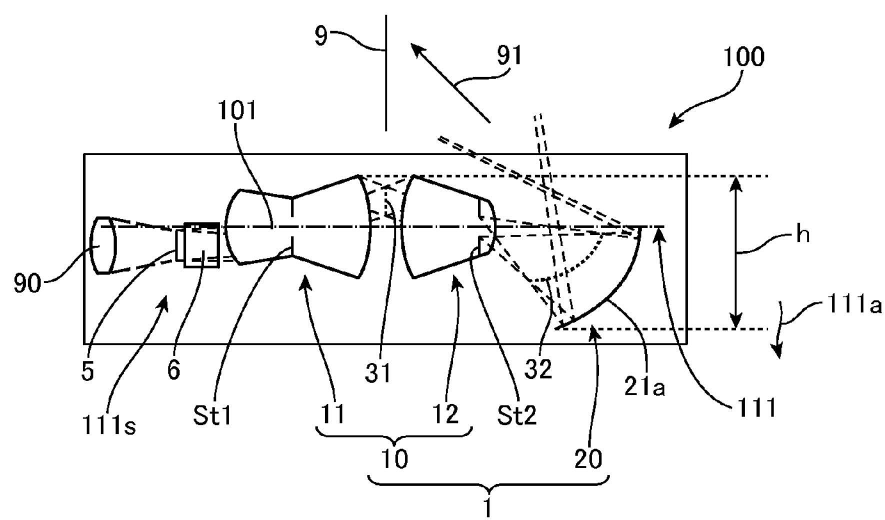

Fig. 3

| LENS SURFACE NUMBER | RADIUS OF CURVATURE (Ri) | DISTANCE (di) | EFFECTIVE DIAMETER (Di) | REFRACTIVE INDEX (nd) | ABBE NUMBER (νd) | LENS NAME | | FOCAL LENGTH | | | GLASS MATERIAL |
|---|---|---|---|---|---|---|---|---|---|---|---|
| | | | | | | | | LENS | CEMENTED | OPTICAL SYSTEM | |
| LIGHT VALVE | Flat | 10.00 | | | | | | | | | |
| PRISM | Flat | 33.00 | | 1.51680 | 64.2 | | | | | | SBSL7 |
| | Flat | 2.60 | | | | | | | | | |
| 1 | 63.47 | 8.65 | 40.0 | 1.69680 | 55.5 | L1 | | 49.5 | | 404.3 | SLAL14 |
| 2 | −72.22 | 0.20 | 40.0 | | | | | | | | |
| 3 | 32.87 | 6.76 | 33.0 | 1.69680 | 55.5 | L2 | | 54.4 | | | SLAL14 |
| 4 | 215.83 | 0.24 | 31.0 | | | | | | | | |
| 5 | 20.02 | 7.30 | 25.0 | 1.59522 | 67.7 | L3 | LB1 | 32.0 | −59.2 | | SFPM2 |
| 6 | −371.10 | 1.24 | 21.0 | 1.80518 | 25.4 | L4 | | −17.5 | | | STIH6 |
| 7 | 14.89 | 3.98 | 16.0 | | | | | | | | |
| 8 | −32.340 | 1.20 | 15.0 | 1.68893 | 31.1 | L5 | | −63.5 | | | LTIM28 |
| 9 | −121.600 | 6.00 | 15.0 | | | | | | | | |
| FIRST STOP | Flat | 9.24 | 18.0 | | | St1 | | | | | |
| 10 | −118.59 | 6.69 | 20.0 | 1.72000 | 50.2 | L6 | | 42.6 | | | SLAL10 |
| 11 | −25.09 | 40.33 | 23.0 | | | | | | | | |
| 12 | 40.46 | 7.33 | 49.0 | 1.69680 | 55.5 | L7 | | 175.3 | | | SLAL14 |
| 13 | 55.80 | 20.89 | 47.0 | | | | | | | | |
| 14 | 86.600 | 13.64 | 48.0 | 1.53113 | 55.8 | L8 | | 111.4 | | | Plastic |
| 15 | −180.640 | 13.02 | 48.0 | | | | | | | | |
| 16 | 10.650 | 10.04 | 36.0 | 1.53113 | 55.8 | L9 | | 51.5 | | 42.9 | Plastic |
| 17 | 11.660 | 16.17 | 32.0 | | | | | | | | |
| 18 | 197.05 | 6.37 | 31.0 | 1.74951 | 35.3 | L10 | | 51.7 | | | SNBH51 |
| 19 | −48.18 | 8.52 | 30.0 | | | | | | | | |
| 20 | 42.13 | 5.57 | 19.0 | 1.80400 | 46.6 | L11 | LB2 | 22.1 | −490.5 | | SLAH65 |
| 21 | −29.44 | 1.20 | 16.0 | 1.69895 | 30.1 | L12 | | −19.6 | | | STIM35 |
| 22 | 26.65 | 1.30 | 14.0 | | | | | | | | |
| 23 | 111.28 | 1.20 | 14.0 | 1.67270 | 32.1 | L13 | LB3 | −39.1 | 32.9 | | STIM25 |
| 24 | 21.36 | 5.13 | 16.0 | 1.80400 | 46.6 | L14 | | 18.2 | | | SLAH65 |
| 25 | −42.69 | 0.20 | 17.0 | | | | | | | | |
| SECOND STOP | Flat | 75.00 | 17.0 | | | St2 | | | | | |
| FIRST REFLECTIVE SURFACE | −31.970 | −750.00 | 80.0 | | | | | | | | |
| SCREEN | Flat | | | | | | | | | | |

| FOCAL LENGTH | F NUMBER | MAXIMUM ANGLE OF VIEW | IMAGE CIRCLE |
|---|---|---|---|
| 6.20 | 1.90 | 66.67 | 28.05 |

(b)

| DISTANCE | |
|---|---|
| LIGHT VALVE TO FIRST REFLECTIVE SURFACE | 323.00 |
| LIGHT VALVE TO L14 | 247.80 |
| REFRACTIVE OPTICAL SYSTEM | 202.40 |
| L8 TO FIRST INTERMEDIATE IMAGE | 3.74 |
| St2 TO SECOND INTERMEDIATE IMAGE | 41.60 |
| L14 TO FIRST REFLECTIVE SURFACE | 75.20 |
| LIGHT VALUE TO FIRST INTERMEDIATE IMAGE | 183.02 |
| FIRST INTERMEDIATE IMAGE TO FIRST REFLECTIVE SURFACE | 139.98 |
| EXIT PUPIL OF FIRST OPTICAL SYSTEM TO FIRST REFLECTIVE SURFACE | 81.70 |

(c)

| | K | A | B | C | D | E | F |
|---|---|---|---|---|---|---|---|
| S8 | 0.0000 | 2.2220E-06 | 1.1670E-07 | -2.2220E-09 | 1.8890E-11 | -9.7170E-14 | |
| S9 | -95.7700 | 3.1520E-05 | 3.8530E-07 | -1.3180E-08 | 3.0210E-10 | -3.5100E-12 | 1.5650E-14 |
| S14 | 0.0000 | -1.8290E-05 | 4.3630E-08 | -6.3910E-11 | 4.1400E-14 | | |
| S15 | 0.0000 | -5.0320E-05 | 1.1720E-07 | -1.4380E-10 | 7.9640E-14 | | |
| S16 | -0.9520 | 7.3370E-05 | -2.6870E-07 | 3.7970E-10 | -4.0170E-13 | | |
| S17 | -0.6870 | 1.5710E-05 | 3.7880E-09 | -4.8100E-10 | 5.4430E-14 | | |
| FIRST REFLECTIVE SURFACE | -3.0190 | -3.4130E-06 | -9.0900E-11 | 3.1690E-13 | -9.7700E-17 | | |

Fig. 5

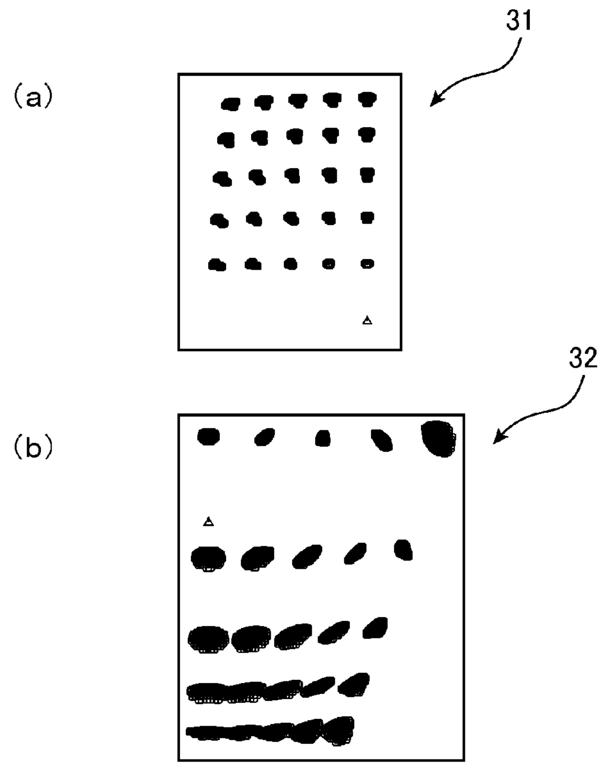

Fig. 7

| LENS SURFACE NUMBER | RADIUS OF CURVATURE (Ri) | DISTANCE (di) | EFFECTIVE DIAMETER (Di) | REFRACTIVE INDEX (nd) | ABBE NUMBER (νd) | LENS NAME | | FOCAL LENGTH | | | | GLASS MATERIAL |
|---|---|---|---|---|---|---|---|---|---|---|---|---|
| | | | | | | | | LENS | CEMENTED | GROUP | OPTICAL SYSTEM | |
| LIGHT VALVE | Flat | 5.00 | | | | | | | | | | |
| COVER GLASS | Flat | 3.00 | | 1.48749 | 70.2 | | | | | | | SFSL5 |
| | Flat | V1 | | | | | | | | | | |
| 1 | 23.95 | 4.50 | 11.0 | 1.69350 | 53.2 | L11 | | 17.1 | | | | SLAL13 |
| 2 | −21.90 | 0.00 | 10.0 | | | | | | | | | |
| FIRST STOP | Flat | 3.35 | 10.0 | | | St1 | | | | | | |
| 4 | −167.67 | 8.00 | 12.0 | 1.80518 | 25.4 | L12 | | −22.9 | | 29.6 | | STIH6 |
| 5 | 21.39 | 10.54 | 15.0 | | | | | | | | | |
| 6 | 233.40 | 10.61 | 33.0 | 1.71300 | 53.9 | L13 | | 38.0 | | | | SLAL8 |
| 7 | −30.20 | V2 | 36.0 | | | | | | | | 28.6 | |
| 8 | 66.22 | 8.00 | 48.0 | 1.77250 | 49.6 | L21 | LB1 | −149.4 | 589.6 | | | SLAH66 |
| 9 | 39.91 | 8.36 | 46.0 | 1.49700 | 81.5 | L22 | | 111.0 | | 589.6 | | SFPL51 |
| 10 | 133.28 | V3 | 46.0 | | | | | | | | | |
| 11 | 26.47 | 9.87 | 54.0 | 1.53113 | 55.8 | L31 | | 291.6 | | | | Plastic |
| 12 | 27.77 | 22.70 | 53.0 | | | | | | | | | |
| 13 | 16.47 | 10.36 | 45.0 | 1.53113 | 55.8 | L32 | | 46.6 | | | | Plastic |
| 14 | 38.10 | 26.83 | 42.0 | | | | | | | | | |
| 15 | −126.90 | 7.40 | 38.0 | 1.77250 | 49.6 | L33 | | 69.6 | | | | SLAH66 |
| 16 | −38.83 | 0.43 | 38.0 | | | | | | | | | |
| 17 | 26.86 | 11.84 | 28.0 | 1.80400 | 46.6 | L34 | | 18.5 | | 44.7 | | SLAH65 |
| 18 | −26.95 | 1.68 | 22.0 | 1.71736 | 29.5 | L35 | LB2 | −8.7 | 174.4 | | 34.4 | STIH1 |
| 19 | 8.43 | 6.44 | 13.0 | 1.80400 | 46.6 | L36 | | 16.8 | | | | SLAH65 |
| 20 | 14.62 | 0.78 | 7.0 | | | | | | | | | |
| SECOND STOP | Flat | 3.66 | 7.0 | | | St2 | | | | | | |
| 21 | 51.62 | 7.07 | 17.0 | 1.88300 | 40.8 | L37 | LB3 | 14.3 | 47.6 | | | SLAH58 |
| 22 | −15.70 | 7.05 | 19.0 | 1.64769 | 33.8 | L38 | | −17.7 | | | | STIM22 |
| 23 | 51.15 | 75.00 | 26.0 | | | | | | | | | |
| FIRST REFLECTIVE SURFACE | −33.35 | −512.00 | 109.3 | | | | | | | | | |
| SCREEN | Flat | | | | | | | | | | | |

| FOCAL LENGTH (WIDE ANGLE ENG) | F NUMBER | MAXIMUM ANGLE OF VIEW | ZOOM RATIO | IMAGE CIRCLE |
|---|---|---|---|---|
| 3.63 | 2.62 | 75.34 | 1.1 | 25.52 |

(b)

| DISTANCE | |
|---|---|
| LIGHT VALVE TO FIRST REFLECTIVE SURFACE | 300.01 |
| LIGHT VALVE TO L38 | 225.01 |
| REFRACTIVE OPTICAL SYSTEM | 217.01 |
| L31 TO FIRST INTERMEDIATE IMAGE | 15.00 |
| St2 TO SECOND INTERMEDIATE IMAGE | 37.40 |
| L38 TO FIRST REFLECTIVE SURFACE | 75.00 |
| LIGHT VALVE TO FIRST INTERMEDIATE IMAGE | 133.77 |
| FIRST INTERMEDIATE IMAGE TO FIRST REFLECTIVE SURFACE | 166.24 |
| EXIT PUPIL OF FIRST OPTICAL SYSTEM TO FIRST REFLECTIVE SURFACE | 84.40 |

(c)

| | K | A | B | C | D |
|---|---|---|---|---|---|
| S1 | 0.0000 | −7.1940E−05 | −5.0600E−07 | −2.8620E−09 | −1.6980E−10 |
| S2 | 0.0000 | −1.8340E−06 | −5.7570E−07 | −3.4590E−09 | −1.0390E−10 |
| S11 | −0.1330 | −2.0050E−05 | −1.6660E−09 | 2.6710E−11 | −3.0960E−14 |
| S12 | 0.0000 | −4.8210E−05 | 3.6240E−08 | −2.1840E−12 | −2.3130E−14 |
| S13 | −0.5940 | −2.5050E−05 | 7.5870E−08 | −2.0240E−10 | 1.2480E−13 |
| S14 | 0.0000 | 5.5910E−07 | 7.1730E−08 | −3.0370E−10 | 4.1550E−13 |
| FIRST REFLECTIVE SURFACE | −0.7330 | 2.0080E−06 | −5.9310E−10 | 1.7690E−13 | −2.1360E−17 |

(d)

| DISTANCE (ZOOMING) | WIDE ANGLE END | TELEPHOTO END |
|---|---|---|
| V1 | 17.50 | 19.12 |
| V2 | 1.00 | 27.42 |
| V3 | 29.04 | 1.00 |

Fig. 9

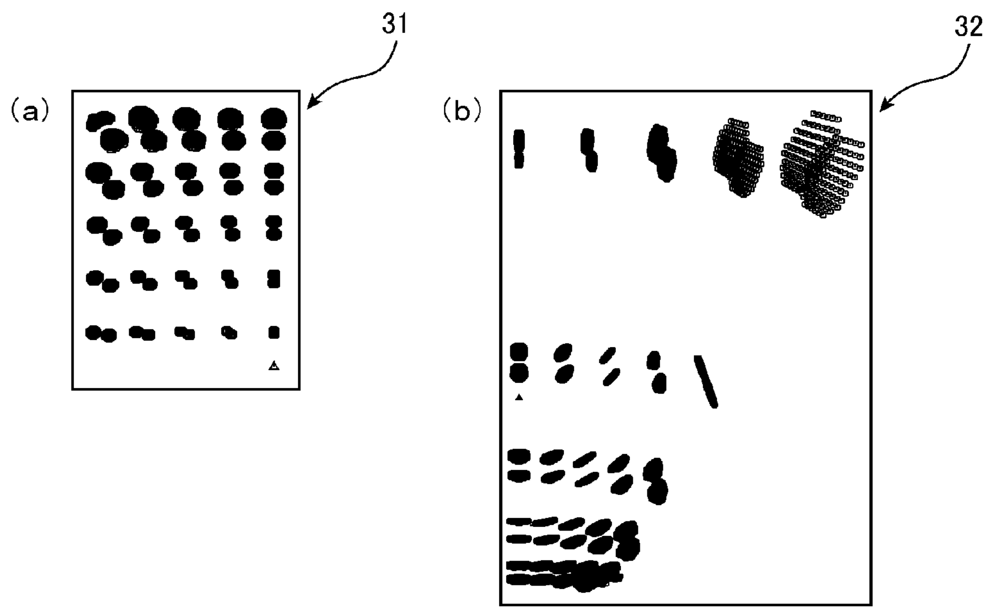

Fig. 11

| LENS SURFACE NUMBER | RADIUS OF CURVATURE (Ri) | DISTANCE (di) | EFFECTIVE DIAMETER (Di) | REFRACTIVE INDEX (nd) | ABBE NUMBER ($\nu d$) | LENS NAME | | FOCAL LENGTH | | | | GLASS MATERIAL |
|---|---|---|---|---|---|---|---|---|---|---|---|---|
| | | | | | | | | LENS | CEMENTED | GROUP | OPTICAL SYSTEM | |
| LIGHT VALVE | Flat | 5.00 | | | | | | | | | | |
| COVER GLASS | Flat | 3.00 | | 1.48749 | 70.2 | | | | | | | S-FSL5 |
| PRISM | Flat | 21.00 | | 1.51680 | 64.2 | | | | | | | BK7 |
| | Flat | 5.00 | | | | | | | | | | |
| 1 | −227.86 | 5.31 | 34.0 | 1.74320 | 49.3 | L11 | | 70.7 | | 70.7 | −154.2 | S-LAM60 |
| 2 | −43.26 | V1 | 34.0 | | | | | | | | | |
| 3 | 33.73 | 7.34 | 32.0 | 1.84666 | 23.8 | L21 | | 33.9 | | 48.6 | | S-TIH53 |
| 4 | −185.02 | 1.67 | 31.0 | | | | | | | | | |
| 5 | 17.62 | 6.93 | 22.0 | 1.59522 | 67.7 | L22 | LB1 | 23.0 | −32.3 | | | S-FPM2 |
| 6 | −52.57 | 1.20 | 18.0 | 1.80518 | 25.4 | L23 | | −11.1 | | | | S-TIH6 |
| 7 | 11.02 | 4.10 | 13.0 | | | | | | | | | |
| 8 | −14.86 | 1.20 | 13.0 | 1.75520 | 27.5 | L24 | LB2 | −8.7 | −126.0 | | | S-TIH4 |
| 9 | 12.26 | 5.05 | 13.0 | 1.74320 | 49.3 | L25 | | 10.9 | | | | S-LAM60 |
| 10 | −19.90 | 5.00 | 13.0 | | | | | | | | | |
| FIRST STOP | Flat | 6.70 | 15.0 | | | St1 | | | | | | |
| 11 | −91.11 | 4.99 | 22.0 | 1.80100 | 35.0 | L26 | | 34.4 | | | | S-LAM66 |
| 12 | −21.80 | V2 | 23.0 | | | | | | | | | |
| 13 | −36.60 | 2.20 | 35.0 | 1.48749 | 70.2 | L31 | | −44.1 | | 160.5 | | S-FSL5 |
| 14 | 53.63 | 2.95 | 41.0 | | | | | | | | | |
| 15 | 115.04 | 12.66 | 43.0 | 1.74320 | 49.3 | L32 | | 42.0 | | | | S-LAM60 |
| 16 | −41.01 | V3 | 45.0 | | | | | | | | | |
| 17 | 167.58 | 14.37 | 49.0 | 1.53113 | 55.8 | L41 | | 110.5 | | 37.9 | | Plastic |
| 18 | −88.10 | 7.96 | 49.0 | | | | | | | | | |
| 19 | 6.40 | 7.61 | 32.0 | 1.53113 | 55.8 | L42 | | 21.4 | | | 32.0 | Plastic |
| 20 | 8.54 | 14.97 | 28.0 | | | | | | | | | |
| 21 | 154.06 | 6.00 | 27.0 | 1.74320 | 49.3 | L43 | | 40.7 | | | | SLAM60 |
| 22 | −37.16 | 0.20 | 26.0 | | | | | | | | | |
| 23 | 16.77 | 6.26 | 19.0 | 1.81600 | 46.6 | L44 | LB3 | 15.5 | −1508.6 | | | SLAH59 |
| 24 | −43.18 | 1.20 | 15.0 | 1.69895 | 30.1 | L45 | | −12.2 | | | | STIM35 |
| 25 | 10.82 | 1.84 | 11.0 | | | | | | | | | |
| 26 | −443.31 | 1.20 | 11.0 | 1.65412 | 39.7 | L46 | LB4 | −17.5 | 29.2 | | | SNBH5 |
| 27 | 11.85 | 3.59 | 10.0 | 1.81600 | 46.6 | L47 | | 11.3 | | | | SLAH59 |
| 28 | −36.37 | 0.20 | 11.0 | | | | | | | | | |
| SECOND STOP | Flat | 75.00 | 11.0 | | | St2 | | | | | | |
| FIRST REFLECTIVE SURFACE | −30.88 | −510.00 | 97.0 | | | | | | | | | |
| SCREEN | Flat | | | | | | | | | | | |

| FOCAL LENGTH (WIDE ANGLE END) | F NUMBER | MAXIMUM ANGLE OF VIEW | ZOOM RATIO | IMAGE CIRCLE |
|---|---|---|---|---|
| 3.46 | 2.43 | 75.32 | 1.1 | 25.11 |

(b)

| DISTANCE | |
|---|---|
| LIGHT VALVE TO FIRST REFLECTIVE SURFACE | 300.01 |
| LIGHT VALVE TO L47 | 224.81 |
| REFRACTIVE OPTICAL SYSTEM | 191.01 |
| L41 TO FIRST INTERMEDIATE IMAGE | 1.00 |
| St2 TO SECOND INTERMEDIATE IMAGE | 33.80 |
| L47 TO FIRST REFLECTIVE SURFACE | 75.20 |
| LIGHT VALVE TO FIRST INTERMEDIATE IMAGE | 174.98 |
| FIRST INTERMEDIATE IMAGE TO FIRST REFLECTIVE SURFACE | 125.03 |
| EXIT PUPIL OF FIRST OPTICAL SYSTEM TO FIRST REFLECTIVE SURFACE | 100.60 |

(c)

| | K | A | B | C | D | E | F |
|---|---|---|---|---|---|---|---|
| S10 | -1.5850 | -8.2680E-06 | 3.8170E-07 | -1.9820E-08 | 6.7190E-10 | -1.1630E-11 | 8.2140E-14 |
| S17 | 0.0000 | -1.0360E-05 | 3.3870E-08 | -6.8450E-11 | 5.1720E-14 | | |
| S18 | 0.0000 | -4.3270E-05 | 1.0400E-07 | -1.3810E-10 | 7.7230E-14 | | |
| S19 | -1.5260 | 8.7670E-05 | -2.8140E-07 | 5.0460E-10 | -8.2370E-13 | | |
| S20 | -0.7980 | -2.2560E-05 | 2.4480E-08 | -8.8150E-10 | -4.2400E-13 | | |
| FIRST REFLECTIVE SURFACE | -0.7220 | 1.8810E-06 | -5.6840E-10 | 1.5020E-13 | -1.0260E-17 | | |

(d)

| DISTANCE (ZOOMING) | WIDE ANGLE END | TELEPHOTO END |
|---|---|---|
| V1 | 1.00 | 4.32 |
| V2 | 40.23 | 32.69 |
| V3 | 17.08 | 21.30 |

Fig. 13

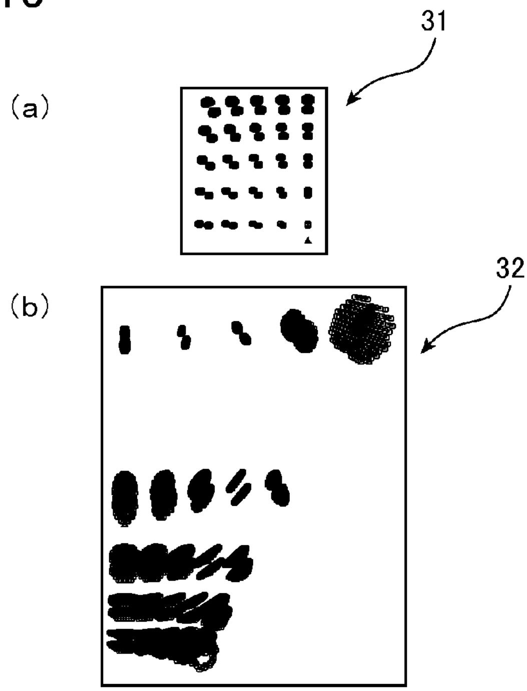

PROJECTION OPTICAL ASSEMBLY WITH MULTIPLE REFRACTIVE OPTICAL SYSTEMS AND RELATED PROJECTOR DEVICE

TECHNICAL FIELD

The present invention relates to a projection optical system of a projector apparatus.

BACKGROUND ART

Japanese Laid-Open Patent Publication No. 2004-258620 (hereinafter "Document 1") discloses the realization of a projection optical system which, in addition to using an image forming optical system including a reflective surface to increase the size on the screen of projected images while reducing the projection space outside a projector apparatus, is capable of correcting chromatic aberration and also an image projecting apparatus that uses such projection optical system. To do so, Document 1 discloses that a first and second optical system are disposed in that order from a light valve on the projection side of the light valve, the first optical system includes at least one refractive optical system and has positive refractive power, the second optical system includes at least one reflective surface with refractive power and has positive refractive power, an image formed by the light valve is formed into an intermediate image on the optical path of the first and second optical systems, and the intermediate image is enlarged further and projected onto a screen.

Japanese Laid-Open Patent Publication No. 2004-295107 (hereinafter "Document 2") discloses a technology that realizes a variable magnification optical system that is compact and achieves a desired zoom ratio while suppressing the occurrence of various aberrations such as lateral chromatic aberration. The variable magnification optical system in Document 2 is composed of an optical block R including three reflective curved surfaces and an optical block C disposed on the reducing side of the optical block R, the optical block C includes a plurality of movable lens units, and zooming is carried out by moving the plurality of lens units. When tracing the optical axis from the reducing side to the enlargement side, the optical block C forms an image at a reducing side conjugate point that is closer to the enlargement side than the optical surface (reflective surface) closest to the reducing side in the optical block R.

In a variety of applications such as presentations and education in schools, there is demand for a projection lens system that is more compact and capable of being made more wide angle.

DISCLOSURE OF THE INVENTION

A first aspect of the present invention is a projection optical system that projects from a first image plane on a reducing side to a second image plane on an enlargement side. The projection optical system includes: a first refractive optical system that includes a plurality of lenses and forms light incident from the reducing side into a first intermediate image on the enlargement side; a second refractive optical system that includes a plurality of lenses and forms the first intermediate image on the reducing side into a second intermediate image on the enlargement side; and a first reflective optical system that includes a first reflective surface with positive refractive power that is positioned closer to the enlargement side than the second intermediate image.

In this projection optical system, by having the first refractive optical system form the first intermediate image and the second refractive optical system form such first intermediate image into the second intermediate image on the enlargement side, it is possible to reduce the lens diameter on the enlargement side of the second refractive optical system. Accordingly, it is possible to make the second refractive optical system compact and additionally it is easy to make an air gap (optical distance) from the second refractive optical system to the first reflective surface shorter, which makes it possible to make the first reflective surface smaller.

It is not easy to create a design where trapezoidal distortion (keystone distortion) is corrected together with astigmatism and the like at the first reflective surface. With this projection optical system, it is easy to have the first refractive optical system form the first intermediate image where aberrations such as astigmatism are corrected and to have the second refractive optical system form the second intermediate image where mainly keystone distortion and the like are adjusted. Accordingly, it is easy to project images that are sharp and in which keystone distortion has been corrected.

In this projection optical system, the first intermediate image, the second intermediate image, and the image formed by the first reflective surface may be respectively inverted. Accordingly, it is possible to design the projection optical system so that when the first refractive optical system forms an image formed on the first image plane as the first intermediate image, a light ray that reaches a center of the second image plane from a center of the first image plane reaches the second image plane having crossed any of an optical axis of the first refractive optical system, an optical axis of the second refractive optical system, and an optical axis of the first reflective optical system three times.

The light ray reaches the center of the second image plane from the center of the first image plane with crossing a common optical axis three times if the optical axis of the first refractive optical system, the optical axis of the second refractive optical system, and the optical axis of the first reflective optical system are common, or any of such axes three times if the respective optical axes are shifted, and the light ray crosses the optical axis twice between the first image plane and the first reflective surface. The first image plane and the first reflective surface can be disposed in the same side (direction) with respect to the optical axis. That makes possible to dispose the first image plane and the first reflective surface in the same side with respect to a first plane that includes the optical axis. This means that it is possible to dispose an illumination optical system that illuminates the first image plane in the same side as the first reflective surface with respect to the first plane. Accordingly, it is possible for the illumination optical system and the first reflective surface to share a space in the same side with respect to the first plane. This means that it is possible to make a projector that includes the projection optical system and the illumination optical system slimmer or thin.

It is preferable for an effective diameter of a lens that is closest to the enlargement side of the second refractive optical system that is located on the enlargement side to be smaller than a maximum effective diameter of the first refractive optical system that is located on the reducing side. It is more preferable for a maximum effective diameter of the second refractive optical system located on the enlargement side to be smaller than a maximum effective diameter of the first refractive optical system located on the reducing side. A projection optical system becomes compact and interference between light rays that reach the first reflective surface and light rays reflected by the first reflective surface can be suppressed.

The first refractive optical system should preferably be an equal magnification or a magnifying optical system. Although the first intermediate image may be a reduced image, by magnifying or forming the first intermediate image with equal size, the magnification ratio of the optical systems that are closer to the enlargement side than the first refractive optical system is relatively suppressed, which makes it easier to correct aberration. It is possible to favorably correct various aberrations such as curvature of field, astigmatism, and comatic aberration using the first refractive optical system and to also correct distortion such as keystone distortion using the second refractive optical system.

It is desirable for the projection optical system to include a stop that is disposed between the first intermediate image and the second intermediate image. It is also possible to make the size on the enlargement side of the second refractive optical system more compact. In addition, since it is possible to make the air gap (distance) between the second refractive optical system and the first refractive optical system shorter, it is possible to make the size of the first reflective surface much more compact.

In this aspect of the invention, the projection optical system could include a first optical system that includes the first refractive optical system and the second refractive optical system, the first intermediate image being formed inside the first optical system and the first optical system being divided into the first refractive optical system and the second refractive optical system, and the exit pupil of the first optical system being closer to the first reflective surface. This means that it is possible to make the first reflective surface smaller. In this case, it is desirable for an optical distance EXP between an exit pupil and the first reflective surface in a case where a first stop disposed between the first image plane and the first intermediate image is as a stop of the first optical system and an optical distance dw between the first image plane and the first reflective surface satisfy the Condition (1) below.

$$0.1<\mathrm{EXP}/dw<0.6 \quad (1)$$

In addition, by forming the first intermediate image inside the first optical system and dividing the first optical system into the first refractive optical system and the second refractive optical system, it is possible to dispose a second stop between the first intermediate image and the second intermediate image to constrain the light flux. This means that it is possible to make the lens size on the enlargement side of the first optical system, and in particular the lens size on the enlargement side of the second refractive optical system smaller. The second stop may be disposed inside the second refractive optical system. The second stop should preferably be an eccentric stop which makes it possible to shut out scattered light such as flare and ghosts.

Also, since it is possible to make the lens size on the enlargement side of the first optical system, that is, the enlargement side of the second refractive optical system smaller, it is possible to suppress interference between the lenses and the light rays from the first reflective surface, even when lenses that have rotational symmetry about the optical axis are used. This means that it is not necessary to dispose a lens with negative power on the enlargement side of the second refractive optical system to achieve sufficient distance between the second refractive optical system and the first reflective surface. Accordingly, the lens closest to the enlargement side of the second refractive optical system may be a positive lens or a positive meniscus lens, and may also be a cemented lens.

In addition, it is desirable for an optical distance do between the lens closest to the enlargement side of the second refractive optical system and the first reflective surface and an optical distance dw between the first image plane and the first reflective surface to satisfy the Condition (2) below $$0.1<dn/dw<0.3 \quad (2).$$

Since it is possible to reduce the space between the lenses included in the second refractive optical system and the first reflective surface, the opening for emitting projected light between the lens and the first reflective surface becomes smaller. Accordingly, it is possible to provide a much more compact projector and to reduce the risk of damage to the lenses and the reflective surface due to dirt or dust that enters from the opening.

In this projection optical system, the first intermediate image and the second intermediate image are typically formed on opposite sides of the optical axis. The first optical system may form one or a plurality of intermediate images on the reducing side of the first intermediate image. Also, the first reflective optical system may include one or a plurality of reflective surfaces before or after the first reflective surface. The projection optical system may also include a refractive optical system on the enlargement side of the first reflective optical system.

Also, the first optical system may be a variable magnification optical system (zoom optical system). It is desirable for the first optical system to include, in order from the reducing side, a former group with positive refractive power, a middle group with positive refractive power, and a latter group with positive refractive power, and when zooming from a wide angle end to a telephoto end, for the former group to move from the reducing side to the enlargement side, for the middle group to move so as to compensate for movement of the former group, and for the latter group to be fixed, and for the first intermediate image to be formed inside the latter group. Light flux that is incident on the latter group can be compensated to a certain state by the middle group and movement of the first intermediate image during zooming can be suppressed. Accordingly, it is possible to zoom the image projected onto the second image plane with hardly any movement in the positions of the first intermediate image and the second intermediate image.

Also, when zooming from the wide angle end to the telephoto end, it is possible to change the magnification ratio of mainly the first intermediate image by moving the former lens group and to correct various aberrations such as curvature of field, astigmatism, and comatic aberration via movement of the middle group. This means that it is possible to provide a high resolution projection optical system that includes a variable magnification (variator) optical system that suppresses fluctuations in aberration and fluctuations in the position of the first intermediate image.

Another aspect of the present invention is a projector including: the projection optical system described above; and a light modulator that forms an image on the first image plane.

BRIEF DESCRIPTION OF THE DRAWINGS

FIG. 1 shows an arrangement of projector apparatuses that use a projection optical system according to the present invention, with FIG. 1(*a*) showing an example of a projector apparatus that uses a non-telecentric projection optical system, FIG. 1(*b*) showing an example of a projector apparatus that uses a telecentric projection optical system, and FIG. 1(*c*) showing an example of a projector apparatus that uses a different telecentric projection optical system.

FIG. 3 shows lens data of the projection optical system according to the first embodiment.

FIG. 4 shows various numeric values of the projection optical system according to the first embodiment, with (a) showing fundamental data, (b) showing gap data, and (c) showing aspherical surface data.

FIG. 5 shows a state of light flux on planes in the peripheries of intermediate images in the projection optical system according to the first embodiment, with (a) showing the periphery of the first intermediate image and (b) showing the periphery of the second intermediate image.

FIG. 7 shows lens data of the projection optical system according to the second embodiment.

FIG. 8 shows various numeric values of the projection optical system according to the second embodiment, with (a) showing fundamental data, (b) showing gap data, (c) showing aspherical surface data, and (d) showing zoom data.

FIG. 9 shows a state of light flux on planes in the peripheries of intermediate images in the projection optical system according to the second embodiment, with (a) showing the periphery of the first intermediate image and (b) showing the periphery of the second intermediate image.

FIG. 11 shows lens data of the projection optical system according to the third embodiment.

FIG. 12 shows various numeric values of the projection optical system according to the third embodiment, with (a) showing fundamental data, (b) showing gap data, (c) showing aspherical surface data, and (d) showing zoom data.

FIG. 13 shows a state of light flux on planes in the peripheries of intermediate images in the projection optical system according to the third embodiment, with (a) showing the periphery of the first intermediate image and (b) showing the periphery of the second intermediate image.

DETAIL DESCRIPTION

Figure 14:
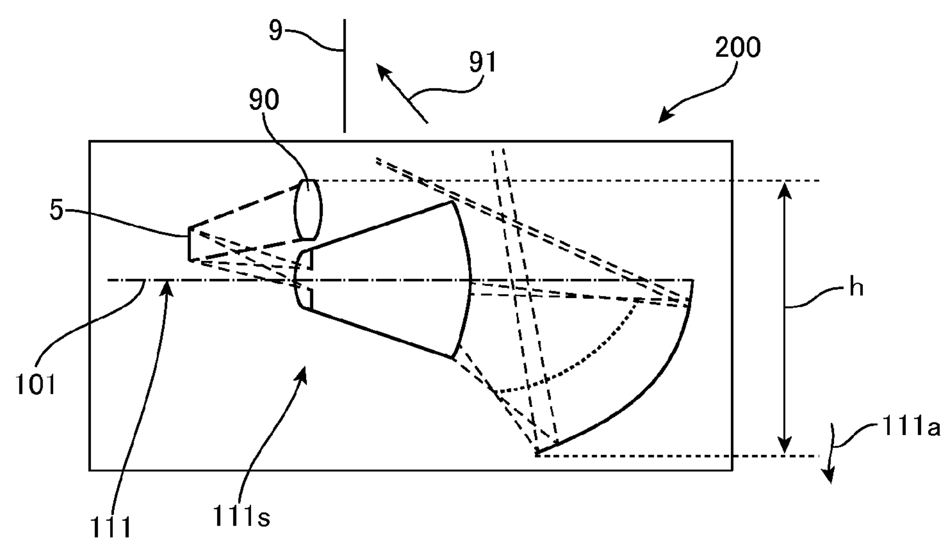
FIG. 14 shows an arrangement of a projector apparatus that uses a conventional projection optical system.

FIG. 1 shows a general configuration of projector apparatuses that uses a typical projection optical system according to an embodiment of the present invention, FIG. 1(*a*) is a diagram showing a configuration of a projector apparatus that uses a non-telecentric projection optical system, FIG. 1(*b*) is a diagram showing a configuration of a projector apparatus that uses a telecentric projection optical system, and FIG. 1(*c*) is a diagram showing a configuration of a projector apparatus that uses a different telecentric projection optical system. FIG. 14 shows a general configuration of a projector apparatus that uses a conventional projection optical system.

As shown in FIGS. 1(*a*) to 1(*c*), the projector (projector apparatus) 100 includes a light modulator (light valve) 5, an illumination (lighting) optical system 90 that illuminates the light valve 5 with illumination light to be modulated, and a projection optical system 1 that enlarges and projects an image formed by the light valve 5 on the light valve 5 that may be a first image plane on the reducing side, with projecting light 91 onto a screen 9 that is a second image plane on the enlargement side. The light valve 5 may be a device capable of forming an image such as an LCD, a digital mirror device (DMD) or an organic EL display, and may be a single panel-type device or a device that uses a method where images of different colors are individually formed. Note that the light valve 5 described above may be a reflective LCD or a transmissive LCD. If the light valve 5 is a transmissive-type, the illumination optical system 90 is disposed on the opposite side of the light valve 5 in the direction of an optical axis 101 of the projection optical system 1. The screen 9 may be a wall surface, a white board, or the like. The projector 100 may be a front projector, or a rear projector that includes a screen. Note that the light valve 5 indicates that position of the first image plane of the light valve.

A typical light valve 5 is a single panel-type video projector that uses a DMD (digital mirror device). The illumination optical system 90 includes a white light source, such as a halogen lamp, and a rotating color splitting filter (color wheel) in the form of a disc, with the DMD (panel, light valve) 5 forming images in the three colors red, green, and blue according to time division. The DMD 5 side of the projection optical system 1 may be non-telecentric as shown in FIG. 1(*a*), but can also be made telecentric using a TIR (Total Internal Reflection) prism Pr as shown in FIG. 1(*b*). Note that when a liquid crystal display is used instead of a DMD, it is also possible to use a color combining prism in place of the TIR prism as shown in FIG. 1(*c*). When a reflective liquid crystal display is used, it is also possible to use both an illumination prism or wire grid and a color combining prism As shown in FIGS. 1(*a*) to 1(*c*), the projection optical systems 1 according to the present invention includes a projection optical system that projects from the DMD 5 that is a first image plane on the reducing side onto the screen 9 that is the second image plane on the enlargement side. The projection optical system 1 includes a first optical system 10 that includes a plurality of lenses and forms a first intermediate image 31, which has been formed inside the first optical system 10 by light that is incident from the reducing side, into a second intermediate image 32 that is closer to the enlargement side than the first optical system 10, and a second optical system (first reflective optical system) 20 that includes a first reflective surface 21*a* with positive refractive power positioned closer to the enlargement side than the second intermediate image 32. The first optical system 10 can be arranged so as to include a first refractive optical system 11 that forms the first intermediate image 31 and a second refractive optical system 12 that forms the first intermediate image 31 into the second intermediate image 32.

In this projection optical system 1, the first intermediate image 31, the second intermediate image 32, and the image focused by the first reflective surface 21*a* are respectively inverted. Accordingly, it is possible to design the projection optical system 1 so that a light ray that reaches the center of the screen 9 from the center of the DMD 5 reaches the screen 9 having crossed the optical axis 101 that is common to the first optical system 10 and the second optical system 20 three times.

If light rays that reach the center of the screen 9 from the center of the DMD 5 reach the screen 9 having crossed the optical axis 101 that is common to the refractive optical system 11, the second refractive optical system 12, and the second optical system 20 three times, the light rays will cross the optical axis 101 twice between the DMD 5 and the first reflective surface 21*a*. Accordingly, the DMD 5 and the first reflective surface 21*a* can be disposed in the same direction with respect to the optical axis 101. That is, the DMD 5 and the first reflective surface 21*a* can be disposed in a first direction 111*a* (the downward side) with respect to a first plane 111 that includes the optical axis 101.

In the same way, the illumination optical system 90 that illuminates the DMD 5 can be disposed in the first direction 111*a* (i.e., the same side as the first reflective surface 21*a*) with respect to the first plane 111. Accordingly, unlike a conventional projector apparatus 200 such as that shown in FIG. 14, it is possible for the illumination optical system 90 and the first reflective surface 21*a* to commonly utilize a space 111*s* in the same first side 111*a* with respect to the first plane 111. This means that the height (thickness) of the separating apparatus 100 including the projection optical system 1 and the illumination optical system 90 can be reduced to half or less than the conventional apparatus 200.

As shown in FIG. 1(*a*) to FIG. 1(*c*), in the projector 100 including the projection optical system 1 according to the present invention, the illumination optical system 90 and the first reflective surface 21*a* can be disposed in the space 111*s* in the same side of the first direction 111*a* with respect to the first plane 111. This means that it is possible to fit the illumination optical system 90 into the height (thickness) h in which the first reflective surface 21*a* fits. Also, even if the thickness of the illumination optical system 90 is large, it will be possible to fit the first reflective surface 21*a* into the thickness h of the illumination optical system 90.

First Embodiment

Figure 2:
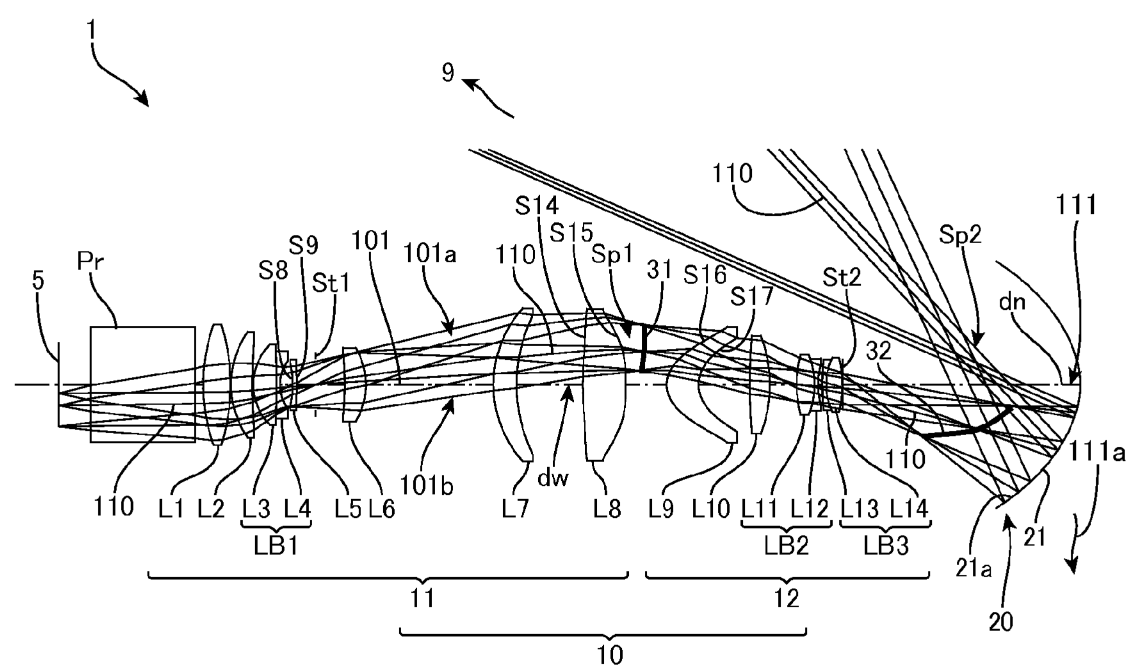
FIG. 2 shows an arrangement of a projection optical system according to a first embodiment.

FIG. 2 shows the projection optical system 1 according to a first embodiment. This projection optical system 1 is a fixed focus-type (single focus-type) projection optical system that is telecentric on the incident side. The projection optical system 1 includes, in order from the side of the DMD 5, which is the first image plane on the reducing side, the first optical system 10 that includes a plurality of lenses and the second optical system (first reflective optical system) 20 that includes the first reflective surface 21*a* that has positive refractive power and projects light emitted from the first optical system 10 onto the screen 9 that is the second image plane on the enlargement side. More specifically, the first optical system 10 includes fourteen lenses L1 to L14. The second optical system 20 includes a single mirror (concave mirror) 21 including the first reflective surface 21*a* in the form of an aspherical surface. The projection optical system 1 in the present embodiment is a single focus (fixed focus) type optical system where zooming is not carried out. In this projection optical system 1, light projected onto the screen 9 that is the second image plane by the plurality of lenses L1 to L14 of the first optical system 10 and the mirror 21 of the second optical system 20 enlarges and projects an image formed on the DMD 5 (that is, the first image plane) onto the screen 9.

The first optical system 10 of this projection optical system 1 forms the first intermediate image 31, which is formed inside the first optical system 10 by light incident from the DMD 5, into the second intermediate image 32 that is closer to the enlargement side than the first optical system 10. The first reflective surface 21*a* of the second optical system 20 is also disposed closer to the enlargement side than the second intermediate image 32. The first optical system 10 shown in FIG. 2 is a refractive optical system that does not include a mirror surface. This first optical system 10 includes the first refractive optical system 11 that forms an image formed by the DMD 5 into the first intermediate image 31 and the second refractive optical system 12 that forms the first intermediate image 31 into the second intermediate image 32. Note that the first optical system 10 may also include a mirror surface for bending the optical axis 101 at an appropriate position.

The first refractive optical system 11 is a lens system which as a whole has positive refractive power. The first refractive optical system 11 is composed, in order from the DMD 5 side, of a biconvex positive lens L1, a positive meniscus lens L2 that is convex on the DMD 5 side, a first cemented lens (balsam lens, doublet) LB1 where two lenses are stuck together, a negative meniscus lens L5 that is convex on the mirror 21 side (enlargement side), a positive meniscus lens L6 that is convex on the mirror 21 side, a positive meniscus lens L7 that is convex on the DMD 5 side (reducing side), and a positive meniscus lens L8 that is biconvex and made of resin. The first cemented lens LB1 is composed of a biconvex positive lens L3 and a biconcave negative lens L4 that are disposed in that order from the DMD 5 side. Both surfaces of the negative meniscus lens L5, that is, the surface S8 on the DMD 5 side and the surface S9 on the mirror 21 side, are aspherical surfaces. Also, both surfaces of the positive meniscus lens L8, that is, the surface S14 on the DMD 5 side and the surface S15 on the mirror 21 side, are aspherical surfaces.

The positive meniscus lens L7 that is second closest to the enlargement side out of the first refractive optical system 11 is the lens with the largest effective diameter (aperture) out of the lenses of the first refractive optical system 11 and is the lens that gives the maximum effective diameter of the first refractive optical system 11. At the same time, the positive refractive lens L7 is the lens with the largest effective diameter (aperture) out of the lenses of the first optical system 10, so that the maximum effective diameter of the first optical system 10 is given by a lens on the enlargement side of the first refractive optical system 11.

A first aperture stop St1 that forms the first intermediate image 31 is disposed in a space on the mirror 21 side of the negative meniscus lens L5, that is, between the negative meniscus lens L5 and the positive meniscus lens L6. A single glass prism (TIR prism) Pr is disposed on the DMD 5 side of the first refractive optical system 11 so that the light incident on the projection optical system 1 becomes telecentric or a state that is near-telecentric. The first refractive optical system 11 forms the image formed by the DMD 5 into the first intermediate image 31 closer to the enlargement side than the first refractive optical system 11, that is, in the space Sp1 between the first refractive optical system 11 and the second refractive optical system 12. The first intermediate image 31 in the present embodiment is formed so as to be separated by an air gap (distance) of 3.74 mm on the enlargement side from the positive meniscus lens L8 that is closest to the enlargement side out of the lenses in the first refractive optical system 11.

The second refractive optical system 12 is a lens system which as a whole has a high positive refractive power and a shorter focal length (focal distance) than the first refractive optical system 11. The second refractive optical system 12 is composed of a positive meniscus lens L9 that is made of resin and is convex on the DMD 5 side, a biconvex positive lens L10, a second cemented lens LB2 where two lenses are stuck together, and a third cemented lens LB3 where two lenses are stuck together, disposed in that order from the DMD 5 side. The second cemented lens LB2 is composed of a biconvex positive lens L11 and a biconcave negative lens L12 that are disposed in that order from the DMD 5 side. The third cemented lens LB3 is composed of a negative meniscus lens L13 that is convex on the DMD 5 side and a biconvex positive lens L14 that are disposed in that order from the DMD 5 side. Both surfaces of the positive meniscus lens L9, that is, the surface S16 on the DMD 5 side and the surface S17 on the mirror 21 side, are aspherical surfaces.

The positive meniscus lens L9 that is closest to the reducing side of the second refractive optical system 12 is the lens with the largest effective diameter (aperture) out of the second refractive optical system 12 and is the lens that provides the maximum effective diameter of the second refractive optical system 12. A second eccentric stop St2 that forms the second intermediate image 32 is disposed on the mirror 21 side of the second refractive optical system 12. The second eccentric stop St2 according to the present embodiment has the center of an aperture (a circular opening) displaced from the optical axis 101 and the degree of eccentricity of such opening from the center is 1.5 mm in the downward direction (first direction) 111*a* with respect to the first plane 111 that includes the optical axis 101. The second refractive optical system 12 forms the second intermediate image 32 closer to the enlargement side than the second refractive optical system 12, that is, in a space Sp2 between the second refractive optical system 12 and the first reflective surface 21*a*. The second intermediate image 32 in the present embodiment is formed on the mirror 21 side of the second eccentric stop St2 so as to be separated by an air gap of 41.60 mm from the second eccentric stop St2.

In this projection optical system 1, the first refractive optical system 11 forms the first intermediate image 31 in the space Sp1 inside the first optical system 10 and the second refractive optical system 12 forms the second intermediate image 32 in the space Sp2 on the enlargement side of the first optical system 10 and on the reducing side of the first reflective surface 21*a* of the second optical system 20. In addition, the aspherical reflective surface 21*a* of the second optical system 20 projects the second intermediate image 32 onto the screen 9 to enlarge and project the image of the DMD 5 onto the screen 9.

In this projection optical system 1, the second refractive optical system 12 disposed closest to the enlargement side of the first optical system 10 forms the first intermediate image 31 formed inside the first optical system 10 as the second intermediate image 32 on the enlargement side of the second refractive optical system 12. The first intermediate image 31 and the second intermediate image 32 are inverted with respect to the optical axis 101. Accordingly, light flux that passes the second refractive optical system 12 crosses the optical axis 101 of the second refractive optical system 12 and the area of the light flux that passes the second refractive optical system 12 tends to be centered on the periphery of the optical axis 101. This means that the maximum effective aperture of the second refractive optical system 12 positioned on the enlargement side of the first optical system 10 can be made smaller than the first refractive optical system 11. In particular, the lens diameter on the enlargement side of the second refractive optical system 12 can be made smaller relative to the lens diameter on the reducing side.

That is, the first refractive optical system 11 forms the first intermediate image 31 in one region (first region) 101*a* that is an upper half relative to the optical axis 101 and the second refractive optical system 12 forms the second intermediate image 32, where up-down and left-right are inverted relative to the first intermediate image 31, in another region (second region) 101*b* that is opposite the region 101*a*, that is, the lower half relative to the optical axis 101. This means that the light flux that reaches the second intermediate image 32 from the first intermediate image 31 is concentrated in the periphery of the optical axis 101 and the second refractive optical system 12 and the first reflective surface 21*a* can be made smaller.

In addition, in the projection optical system 1, a light ray or light rays 110 that reach the center of the second image plane of the screen 9 from the center of the first image plane formed on the DMD 5 reach the screen 9 having crossed the optical axis 101 that is common to the first optical system 10 and the second optical system 20 three times. More specifically, the light rays 110 emitted from the DMD 5 are incident on the projection optical system 1 from below (in the FIG. 2) the optical axis 101, cross the optical axis 101 inside the first refractive optical system 11, and are formed into the first intermediate image 31 above the optical axis 101. Then, the light rays 110 cross the optical axis 101 inside the second refractive optical system 12 and are formed into the second intermediate image 32 below the optical axis 101. The light rays 110 are also reflected by the first reflective surface 21*a* below the optical axis 101 and are projected onto the screen 9 after crossing the optical axis 101 once again. Note that "above" and "below" the optical axis 101 are relative positional relationships and that above and below the optical axis 101 may be interchanged, or may be to the left and right of the optical axis 101.

The first optical system 10 forms the first intermediate image 31 internally and forms such first intermediate image 31 into the second intermediate image 32 on the enlargement side. This means that it is possible to provide the eccentric stop St2 for forming the second intermediate image 32 formed on the enlargement side at a position closer the enlargement side within the first optical system 10 or closer to the enlargement side than the first optical system 10. Accordingly, it is possible to reduce the air gap between the second intermediate image 32 formed on the reducing side of the first reflective surface 21*a* and the eccentric stop St2. This means that it is possible to provide sufficient widening for the light flux that reaches the first reflective surface 21*a* from the second intermediate image 32 relative to the size of the second intermediate image 32. Accordingly, it is possible to reduce the lens diameter on the enlargement side of the second refractive optical system 12 and to reduce the diameter of surface of the first reflective surface 21*a* that has rotational symmetry about the optical axis 101.

This projection optical system can be designed so that the optical distance EXP between the exit pupil of the first optical system 10 and the first reflective surface 21*a* and the optical distance dw between the DMD and the first reflective surface 21*a* satisfy Condition (1) below.

$$0.1<EXP/dw<0.6 \tag{1}$$

By setting the distance EXP between the exit pupil of the first optical system 10 and the first reflective surface 21*a* in a range that satisfies Condition (1), it is possible to bring the exit pupil of the first optical system closer to the first reflective surface 21*a*. This means that it is possible to make the first reflective surface 21*a* smaller. When the upper limit in Condition (1) is exceeded, the air gap between the lens on the enlargement side of the first optical system 10 and the first reflective surface 21*a* becomes longer, which makes it difficult to make the first reflective surface 21*a* smaller. When the lower limit in Condition (1) is exceeded, it is difficult to suppress interference between light that has been reflected by the first reflective surface 21*a* toward the screen 9 and the second refractive optical system 12. It is desirable for the upper limit in Condition (1) to be 0.4. It is desirable for the lower limit in Condition (1) to be 0.2, with 0.24 being even more desirable.

In addition, since it is possible to reduce the lens diameter on the enlargement side of the second refractive optical system 12, it is possible to suppress interference between light that has been reflected by the first reflective surface 21*a* toward the screen 9 and the second refractive optical system 12 even if the second refractive optical system 12 is formed of lenses that have surfaces with rotational symmetry centered on the optical axis 101. Accordingly, it is possible to provide the projection optical system 1 that is capable of reducing the air gap between the second refractive optical system 12 and the first reflective surface 21*a*, has a compact overall construction, and is capable being made more wide angle.

The projection optical system 1 can be designed so that the distance dn between the enlargement side of the first optical system 10, that is, a lens (in the present embodiment, the positive lens L14) disposed closest to the mirror 21 and the first reflective surface 21*a* and the distance dw between the DMD 5 and the first reflective surface 21*a* satisfy Condition (2) below.

$$0.1 < dn/dw < 0.3 \quad (2)$$

By setting the distance dn between the first optical system 10 and the first reflective surface 21*a* in the range of Condition (2), it is possible to reduce the space Sp2 between the first optical system 10 and the first reflective surface. This makes it easier to suppress mechanical damage to the lens on the wide angle side of the first optical system 10 (the positive lens L14) and the first reflective surface 21*a*. If the upper limit in Condition (2) is exceeded, the space Sp2 between the lens L14 on the wide angle side and the first reflective surface 21*a* becomes relatively large, which increases the risk of receiving mechanical damage. If the lower limit in Condition (2) is exceeded, the space Sp2 becomes small, the first reflective surface 21*a* becomes too close to the second intermediate image 32, and it is not possible to make system sufficiently more wide angle. It is desirable for the upper limit of Condition (2) to be 0.26. It is also desirable for the lower limit of Condition (2) to be 0.15.

It is possible to set the ratio of the effective diameter MD of the first reflective surface 21*a* to the image circle IC on the reducing side of the projection optical system 1 as shown in Condition (3) below.

$$1.0 \le MD/IC \le 6.0 \quad (3)$$

The upper limit of Condition (3) may be 5.0, with 4.5 being even more preferable. Also, the lower limit of Condition (3) may be 2.0, with 2.5 being even more preferable. It is possible to provide the projection optical system 1 which enables the first reflective surface 21*a* to be made smaller relative to the size of the image circle IC and which is even more compact.

It is also possible to set the ratio of the effective diameter LLD of the lens closest to the enlargement side out of the first optical system 10 (in the present embodiment, the lens L14) to the image circle IC on the reducing side of the projection optical system 1 as shown in Condition (4) below.

$$0.1 \le LLD/IC \le 2.0 \quad (4)$$

The upper limit of Condition (4) may be 1.5, with 1.0 being even more preferable. Also, the lower limit of Condition (4) may be 0.2, with 0.3 being even more preferable. It is possible to provide the projection optical system 1 where, by making the lens diameter (effective diameter) closest to the enlargement side of the first optical system 10 smaller relative to the size of the image circle IC, it is possible to prevent interference between the light flux (projected light) reflected by the first reflective surface 21*a* and the lenses, and which is even compact.

It is possible to set the ratio of the diameter STD2 of the eccentric stop St2 to the effective diameter MD of the first reflective surface 21*a* of the projection optical system 1 as shown in Condition (5) below.

$$1.0 \le MD/STD2 \le 30 \quad (5)$$

The upper limit of Condition (5) may be 25, with 20 being preferable and 18 being even more preferable. Also, the lower limit of Condition (5) may be 2.0, with 3.0 being desirable and 4.0 being even more desirable. By providing the eccentric stop St2 on the enlargement side of the projection optical system 1 to set the effective diameter MD of the first reflective surface 21*a* in the range given above, it is possible to make the effective diameter MD smaller.

The maximum effective diameter of the first refractive optical system 11 is the effective diameter of the positive meniscus lens L7 (in the present embodiment, 49.0 mm), and the effective diameter of the positive lens L14 that is closest to the enlargement side of the second refractive optical system 12 is 17.0 mm in the present embodiment. The maximum effective diameter of the second refractive optical system 12 is the effective diameter of the positive meniscus lens L9 (in the present embodiment, 36.0 mm). Accordingly, the effective diameter of the lens L14 that is closest to the enlargement side of the second refractive optical system 12 is smaller than the maximum effective diameter of the first refractive optical system 11 and also the maximum effective diameter of the second refractive optical system 12 is smaller than the maximum effective diameter of the first refractive optical system 11. Accordingly, in the first optical system 10 as a whole, the lens diameter is smaller on the enlargement side than on the reducing side and in the second refractive optical system 12 also, the lens diameter is smaller on the enlargement side than on the reducing side.

The first optical system 10 includes the first refractive optical system 11 and the second refractive optical system 12 and is constructed so that light rays are relayed via the first intermediate image 31. Accordingly, it is possible to construct the respective refractive optical systems 11 and 12 so that a sharp image is projected onto the screen 9. That is, when looking from the enlargement side (wide angle side), the first reflective surface 21*a* produces keystone distortion (trapezoidal distortion) and it is difficult to design the first reflective surface 21*a* so as to correct keystone distortion along with astigmatism and the like. In this system, the second intermediate image 32 is assumed to have keystone distortion, and the first intermediate image 31 in which aberrations such as curvature of field, astigmatism, and comatic aberration have been corrected is formed by the first refractive optical system 11, and an image where mainly keystone distortion or the like of the first intermediate image 31 has been adjusted by the second refractive optical system 12, that is, the second intermediate image 32 where distortion has been produced in the opposite direction (cancelling direction) to the distortion that will be produced by the first reflective surface 21*a* is formed. Accordingly, the projection optical system 1 including the first optical system 10 and the second optical system 20 is capable of projecting sharp images on which keystone correction has been carried out onto the screen 9.

In this way, the projection optical system 1 includes, on both sides of the first intermediate image 31, the first refractive optical system 11 on the reducing side (the DMD 5 side) of the first intermediate image 31 and the second refractive optical system 12 on the enlargement side (the mirror 21 side) of the first intermediate image 31. This means that by forming the first intermediate image 31 using the first refractive optical system 11, it is possible to correct aberrations such as curvature of field, astigmatism, and comatic aberration and by also forming the second intermediate image 32 using the second refractive optical system 12, it is possible to adjust for keystone distortion and thereby correct distortion. Accordingly, by using a configuration with the first intermediate image 31 in between the two refractive optical systems 11 and 12, it becomes possible to design the first refractive optical system 11 and the second refractive optical system 12 as respectively dedicated optical systems. This means that there is increased freedom when designing the respective refractive optical systems 11 and 12.

The positive meniscus lens L8 that is biconvex, made of resin, and disposed on the reducing side of the first intermediate image 31 and closest to the enlargement side of the first refractive optical system 11 has low power, and both surfaces S14 and S14 are aspherical surfaces. This means that it is possible to favorably correct various aberrations and to suppress a drop in the MTF of the first intermediate image 31. Also, the surface S16 on the reducing side of the positive meniscus lens L9 that is convex on the reducing side, made of resin, and disposed closest to the reducing side of the second refractive optical system 12, that is, on the enlargement side of the first intermediate image 31 has the smallest radius of curvature (that is, a large curvature) out of the first optical system 10, and the surface S17 on the enlargement side has the next smallest radius of curvature (that is, a large curvature) after the surface S16. This means that it is easy to adjust the keystone distortion of the first intermediate image 31 and to form the second intermediate image 32 that includes been keystone distortion. In addition, since both surfaces S16 and S17 of the positive meniscus lens L9 are aspherical surfaces, correction of various aberrations aside from keystone distortion can be carried out at the same time. Accordingly, by using a simple construction of disposing the positive meniscus lens L9 made of resin closest to the DMD 5 side of the second refractive optical system 12, it is possible to obtain, at low cost, the second intermediate image 32 where various aberrations aside from keystone distortion are suppressed.

FIG. 3 shows lens data of the lenses of the first optical system 10 of the projection optical system 1. FIG. 4 shows various numeric values of the projection optical system 1. In the lens data, "Ri" represents the radius of curvature (mm) of each lens (i.e., each lens surface) disposed in order from the DMD (light valve) 5 side (the reducing side), "di" represents the distance (mm) between the respective lens surfaces disposed in order from the DMD 5 side, "Di" represents the effective diameter (mm) of each lens surface disposed in order from the DMD 5 side, "nd" represents the refractive index (d line) of each lens disposed in order from the DMD 5 side, and "vd" represents the Abbe number (d line) of each lens disposed in order from the DMD 5 side. In FIG. 3, "Flat" indicates a flat surface. In FIG. 4(*c*), "En" represents "10 to the power n" and as one example, "E-06" represents "10 to the power −6". The same also applies to the following embodiments. In the present specification, the position of the first intermediate image 31 is shown by the focus point position of the light flux of the first intermediate image 31 on the optical axis 101. The position of the second intermediate image 32 is shown as the averaged position of the optical distance d1 from the second eccentric stop St2 to the second intermediate image 32 on the optical axis 101 and the optical distance d2 between the second eccentric stop St2 and the closest periphery (closest edge) of the second intermediate image 32. In the present embodiment, since d1 is 58.20 mm and d2 is 25.00 mm, the position of the second intermediate image 32 is shown at the position 41.60 mm from the second eccentric stop St2. This is also the same as the following embodiments.

FIG. 5 shows the light flux that crosses a flat plane in the peripheries of the first intermediate image 31 and the second intermediate image 32 of the projection optical system 1 by way of spot diagrams. As shown in FIG. 5(*a*), at the periphery of the first intermediate image 31, the image formed by the DMD 5 has been inverted in the up-down and left-right directions as an image that has been enlarged by the first refractive optical system 11. As shown in FIG. 5(*b*), at the periphery of the second intermediate image 32, the first intermediate image 31 is inverted in the up-down and left-right directions as an image that has keystone distortion due to the second refractive optical system 12.

Since the values in the equation given as Condition (1) described above of this projection optical system 1 is such that the optical distance EXP between the exit pupil of the first optical system 10 and the first reflective surface 21*a* is 81.70 mm and the optical distance dw between the DMD 5 and the mirror 21 is 323.00 mm as shown in FIG. 4(*b*), the result shown below is produced. Since the values in the equation given as Condition (2) described above of this projection optical system 1 is such that the distance dn between the positive lens L14 and the mirror 21 is 75.20 mm and the distance dw between the DMD 5 and the mirror 21 is 323.00 mm as shown in FIG. 4(*b*), the result shown below is produced. Also, the other Conditions (3) to (5) are as indicated below. Note that the position of the exit pupil of the first optical system 10 shows the position of the exit pupil when the first stop St1 on the reducing side is used as the stop of the first optical system 10.

$$EXP/dw=0.25 \quad \text{Condition (1)}$$

$$dn/dw=0.23 \quad \text{Condition (2)}$$

$$MD/ID=2.8 \quad \text{Condition (3)}$$

$$LLD/ID=0.6 \quad \text{Condition (4)}$$

$$STD2/MD=4.7 \quad \text{Condition (5)}$$

Accordingly, the projection optical system 1 according to the present embodiment satisfies Conditions (1) to (5).

As shown in the above, by being constructed of the fourteen lenses L1 to L14 and a single mirror 21, the projection optical system 1 according to the present embodiment is one example of a high-performance projection optical system 1 that has a fixed focus point but is comparatively wide angle with a maximum angle of view (full angle) of 66.67 degrees and a focal length of 6.20, and is capable, with an F number of 1.90, of projecting bright, sharp images.

Note that both surfaces S8 and S9 of the negative meniscus lens L5 of the first refractive optical system 11, both surfaces S14 and S15 of the positive meniscus lens L8 of the first refractive optical system 11, both surfaces S16 and S17 of the positive meniscus lens L9 of the second refractive optical system 12, and the first reflective surface 21*a* are aspherical surfaces that exhibit rotational symmetry. The aspherical surfaces are expressed by the following expression using the coefficients K, A, B, C, and D shown in FIG. 4(*c*) with X as the coordinate in the optical axis direction, Y as the coordinate in a direction perpendicular to the optical axis, the direction in which light propagates as positive, and R as the paraxial radius of curvature. This is also the case for the embodiments described later.

$$X=(1/R)Y^2/[1+\{1-(1+K)(1/R)^2Y^2\}^{1/2}]+AY^4+BY^6+CY^8+DY^{10}+EY^{12}+FY^{14}$$

Second Embodiment

Figure 6:
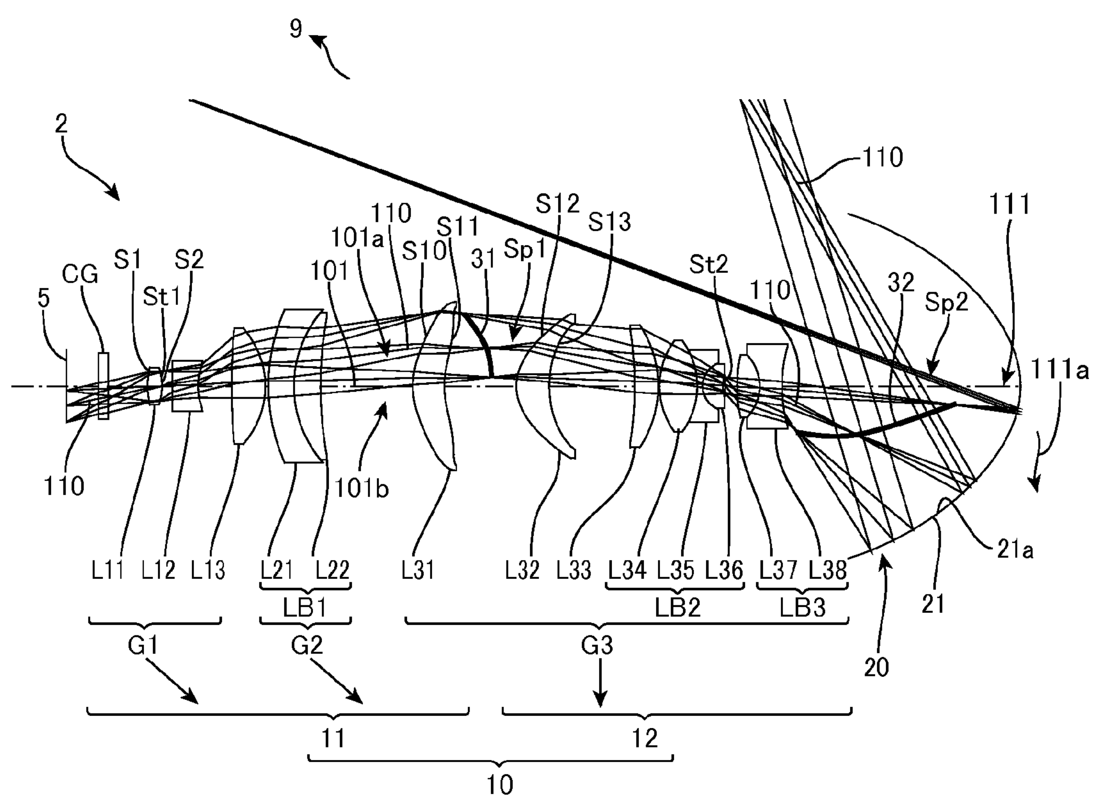
FIG. 6 shows an arrangement of a projection optical system according to a second embodiment.

FIG. 6 shows a projection optical system 2 according to a second embodiment. The projection optical system 2 is a projection optical system that is non-telecentric on the incident side and is capable of zooming. The projection optical system 2 includes, in order from the DMD 5 side (the reducing side), the first optical system 10, which includes a plurality of lenses, and the second optical system (first reflective optical system) 20 that includes the first reflective surface 21*a* that reflects light emitted from the first optical system 10 to project an image onto the screen 9. The first optical system 10 includes thirteen lenses L11 to L13, L21 to L22, and L31 to L38, and the second optical system 20 includes a mirror (curved mirror) 21 on which an aspherical first reflective surface 21*a* is formed.

This projection optical system 2 is a zoom-type (variable magnification type) optical system that carries out zooming. The first optical system 10 includes, in order from the DMD 5 side, a first lens group (former group) G1 that has positive refractive power, a second lens group (middle group) G2 that has positive refractive power, and a third lens group (latter group) G3 that has positive refractive power. Also, the first optical system 10 according to the present embodiment is an optical system that forms the first intermediate image 31 formed inside the first optical system 10 into the second intermediate image 32 that is closer to the enlargement side than the first optical system 10. The first optical system 10 includes the first refractive optical system 11 that has positive power and forms the image formed by the DMD 5 into the first intermediate image 31 and the second refractive optical system 12 that has positive power and forms the first intermediate image 31 into the second intermediate image 32. The first intermediate image 31 is formed inside the third lens group G3, with the first lens group G1, the second lens group G2, and the first lens (on the reducing side) L31 of the third lens group G3 configure the first refractive optical system 11, with the other lenses of the third lens group G3 configuring the second refractive optical system 12.

The first lens group (former group) G1 closest to the DMD 5 (closest to the reducing side) is a lens group that as a whole has positive refractive power. The first lens group G1 is composed of a biconvex positive lens L11, a biconcave negative lens L12, and a biconvex positive lens L13 disposed in that order from the DMD 5 side. Both surfaces of the positive lens L11, that is, the surface S1 on the DMD 5 side and the surface S2 on the mirror 21 side, are aspherical surfaces. A first aperture stop St1 is disposed in a space on the mirror 21 side of the positive lens L11, that is, in a space between the positive lens L11 and the negative lens L12. A single cover glass CG made of glass is disposed on the DMD 5 side of the first lens group G1.

The second lens group (middle group) G2 is a lens group that as a whole has positive refractive power. The second lens group G2 is composed of a first cemented lens (balsam lens, doublet) LB1 where two lenses are stuck together. The first cemented lens LB1 is constructed of a negative meniscus lens L21 that is convex on the DMD 5 side and a positive meniscus lens L22 that is convex on the DMD 5 side which are disposed in that order from the DMD 5 side.

The third lens group (latter group) G3 closest to the mirror 21 side (the enlargement side) is a lens group that as a whole has positive refractive power. The third lens group G3 is constructed of a positive meniscus lens L31 that is made of resin and convex on the DMD 5 side, a positive meniscus lens L32 that is made of resin and is convex on the DMD 5 side, a positive meniscus lens L33 that is convex on the mirror 21 side, a second cemented lens (balsam lens, triplet) LB2 where three lenses are stuck together, and a third cemented lens (balsam lens, doublet) LB3 where two lenses are stuck together, disposed in that order from the DMD 5 side.

The second cemented lens LB2 is constructed of a biconvex positive lens L34, a biconcave negative lens L35, and a positive meniscus lens L36 that is convex on the DMD 5 side disposed in that order from the DMD 5 side. The third cemented lens LB3 is constructed of a biconvex positive lens L37 and a biconcave negative lens L38 disposed in that order from the DMD 5 side. Both surfaces of the positive meniscus lens L31, that is, the surface S10 on the DMD 5 side and the surface S11 on the mirror 21 side, are aspherical surfaces. In addition, both surfaces of the positive meniscus lens L32, that is the surface S12 on the DMD 5 side and the surface S13 on the mirror 21 side are aspherical surfaces. A second eccentric stop St2 is disposed on the mirror 21 side of the positive meniscus lens L36, that is in the space between the positive meniscus lens L36 and the positive lens L37.

In this projection optical system 2, when zooming from the wide angle end to the telephoto end, the first lens group (former group) G1 moves from the reducing side (the DMD 5 side) to the enlargement side (the mirror 21 side), the second lens group (middle group) G2 also moves from the reducing side to the enlargement side, and the third lens group (latter group) G3 does not move. The first lens group G1 zooms by moving as a variator, the second lens group G2 moves as a compensator so as to compensate for the movement of the first lens group G1 so that the light flux incident on the third lens group G3 that is the relay lens satisfies certain conditions. This projection optical system 2 is a floating focus or inner focus type optical system that adjusts the focus point inside the third lens group G3 that does not move during zooming. Focusing in the present embodiment is carried out by moving at least one lens included in the third lens group G3.

The first refractive optical system 11, which is composed of the first lens group G1, the second lens group G2, and the lens L31, includes the positive lens L11, the first stop SU, the negative lens L12, the positive lens L13, the first cemented lens LB1, and the positive meniscus lens L31, disposed in that order from the DMD 5 side, and the first intermediate image 31 is formed on the enlargement side of the first refractive optical system 11, that is, in the space Sp1 between the first refractive optical system 11 and the second refractive optical system 12. The first intermediate image 31 in the present embodiment is formed so as to be separated by an air gap (air distance) of 15.00 mm from the first meniscus lens L31 on the enlargement side.

The second refractive optical system 12 constructed of the third lens group G3 aside from the lens L31 includes the positive meniscus lens L32, the positive meniscus lens L33, the second cemented lens LB2, the second stop St2, and the third cemented lens LB3, disposed in that order from the DMD 5 side. The second intermediate image 32 is formed on the enlargement side of the second refractive optical system 12, that is, in the space Sp2 between the second refractive optical system 12 and the first reflective surface 21*a*. The second intermediate image 32 in the present embodiment is formed so as to be separated by an air gap of 37.40 mm from the second stop St2 on the enlargement side.

In this projection optical system 2 also, the first refractive optical system 11 forms the first intermediate image 31 in the space Sp1 inside the first optical system 10 and the second refractive optical system 12 forms the second intermediate image 32 in the space Sp2 that is closer to the enlargement side than the first optical system 10. In the projection optical system 2 that is non-telecentric on the incident side, the power of the first refractive optical system 11 is designed so as to be substantially the same as or larger than the power of the second refractive optical system 12, and in this projection optical system 2, the power of the first refractive optical system 11 is higher than the power of the second refractive optical system 12. In the projection optical system 2, the first intermediate image 31 and the second intermediate image 32 are respectively formed in regions 101*a* and 101*b* on opposite sides of the optical axis 101 and the light flux that passes the second refractive optical system 12 is concentrated about the optical axis 101. Accordingly, the second refractive optical system 12 can be formed so as to be compact.

In the projection optical system 2 also, the light ray 110 that reaches the center of the second image plane of the screen 9 from the center of the first image plane formed on the DMD 5 reaches the screen 9 having crossed the optical axis 101 that is common to the first optical system 10 and the second optical system 20 three times. The first intermediate image 31 is formed inside the first optical system 10 and such first intermediate image 31 is formed into the second intermediate image 32 on the enlargement side of the first optical system 10. The second stop St2 for forming the second intermediate image 32 disposes at a position that is close to the enlargement side inside the first optical system 10. Accordingly, in the projection optical system 2 also, in the same way as the projection optical system 1, it is possible to reduce the lens diameter on the enlargement side of the first optical system 10 and to make the air gap between the first optical system 10 and the first reflective surface 21*a* shorter. This means that it is possible to provide the projection optical system 2 that is compact and can be made wide angle.

In this system 2, it is also possible to correct various aberrations such as curvature of field, astigmatism, and comatic aberration using the first refractive optical system 11 and to correct distortion such as keystone distortion using the second refractive optical system 12. This means that it is possible to provide the projection optical system 2 that has high performance and is capable of zooming.

In the present embodiment, the positive meniscus lens L31 that is made of resin, is convex on the reducing side, and is disposed closest to the enlargement side of the first refractive optical system 11, that is directly upstream of the first intermediate image 31 has the weakest power in the first optical system 10 and both surfaces S10 and S11 are aspherical surfaces. This means that various aberrations can be favorably adjusted by the positive meniscus lens L31 and the first intermediate image 31 formed by enlarging the image formed by the DMD 5 can be formed much more sharply.

Also, the first refractive optical system 11 tilts the first intermediate image 31 toward the reducing side as the image height increases, that is as the image becomes distant from the optical axis 101, so as to form the first intermediate image 31 so as to become distant from the positive meniscus lens L32. In addition, in the second refractive optical system 12, both surfaces S12 and S13 of the positive meniscus lens L32 that is made of resin, is convex on the reducing side, and is disposed closest to the reducing side, that is, immediately downstream of the first intermediate image 31 have a small radius of curvature (that is, a large curvature). By such arrangement, keystone distortion to the first intermediate image 31 is easy to adjust and it is possible to form the first intermediate image 31 as the second intermediate image 32 that includes keystone distortion. In addition, since both surfaces S12 and S13 of the positive meniscus lens L32 are aspherical surfaces, it is possible to favorably correct various aberrations aside from keystone distortion (distortion). In addition, since the positive meniscus lens L32 is convex on the DMD 5 side and the radii of curvature of both surfaces S12 and S13 are small (that is, the curvature is large), it is possible to collect wide range of the light emitted from the first refractive optical system 11. Accordingly, it is possible to provide the projection optical system 2 that is bright and has a wide angle of view.

The maximum effective diameter of the first refractive optical system 11 is given by the positive meniscus lens L31 (an effective diameter of 54.0 mm in the present embodiment), and the positive meniscus lens L31 has the maximum effective diameter in the first optical system 10. The effective diameter of the negative lens L38 that is closest to the enlargement side of the second refractive optical system 12 is 26.0 mm in the present embodiment, which is smaller than the maximum effective diameter of the first refractive optical system 11. In addition, the maximum effective diameter of the second refractive optical system 12 is given by the positive meniscus lens L32 (an effective diameter of 45.0 mm in the present embodiment), which is smaller than the maximum effective diameter of the first refractive optical system 11. In this way, in the projection optical system 2 also, by having the first refractive optical system 11 form the image formed by the DMD 5 as the first intermediate image 31, it is possible to make the second refractive optical system 12 that is downstream of the first intermediate image 31 smaller.

Also in this system 2, the first refractive optical system 11 forms the first intermediate image 31 in the first region (one region) 101*a* and the second refractive optical system 12 forms the second intermediate image 32 in the second region (the other region) 101*b*. By such arrangement, the used region of both surfaces S12 and S13 of the positive meniscus lens L32 is limited to the first region 101*a* and the used region of the mirror 21 is limited to the second region 101*b*.

Also in this system 2, the second refractive optical system 12 forms the first intermediate image 31 that has little distortion as the second intermediate image 32 that is inverted in the up-down and left-right directions. By such arrangement, it is easy to form the second intermediate image 32 with keystone distortion while cutting out scattered light (unneeded light). Accordingly, it is possible to provide the projection optical system 2 that is capable of projecting onto the screen 9 enlarged and sharp images in which keystone distortion has been effectively cancelled out.

FIG. 7 shows lens data of the various lenses of the first optical system 10 of the projection optical system 2. FIG. 8 shows various numeric values of the projection optical system 2. In the present embodiment, since the optical distance d1 of the second intermediate image 32 on the optical axis 101 from the second stop St2 is 53.30 mm and the optical distance d2 from the second stop St2 to the closest periphery (closest edge) of the second intermediate image 32 is 21.40 mm, the shown position of the second intermediate image 32 is calculated as 37.40 mm from the second stop St2. Note that the distance V1 varied in zooming indicates the air distance (gap) between the cover glass CG and the first lens group G1, the distance V2 indicates the air gap between the first lens group G1 and the second lens group G2, and the distance V3 indicates the air gap between the second lens group G2 and the third lens group G3.

FIG. 9 shows the light flux in the peripheries of the first intermediate image 31 and the second intermediate image 32 of the projection optical system 2 by way of spot diagrams. It can be understood that the second intermediate image 32 includes keystone distortion and that keystone distortion is corrected in the first intermediate image 31.

For the projection optical system 2 of this embodiment, Conditions (1) to (5) described above are as indicated below.

$$EXP/dw=0.28 \quad \text{Condition (1)}$$

$$dn/dw=0.25 \quad \text{Condition (2)}$$

$$MD/ID=4.3 \quad \text{Condition (3)}$$

$$LLD/ID=1.0 \quad \text{Condition (4)}$$

$STD2/MD=16.6$ Condition (5)

Accordingly, the projection optical system 2 of this embodiment also satisfies Conditions (1) to (5).

By arranging the thirteen lenses L11 to L13, L21 to L22, and L31 to L38 and the single mirror 21 as above, the projection optical system 2 according to the second embodiment is a high performance, non-telecentric projection optical system that is comparatively bright with an F number of 2.62, is capable of zooming, is wide angle with a maximum angle of view (full angle) of 75.34 degrees and a focal length of 3.63 at the wide-angle end, and is capable of projecting sharp images.

Third Embodiment

Figure 10:
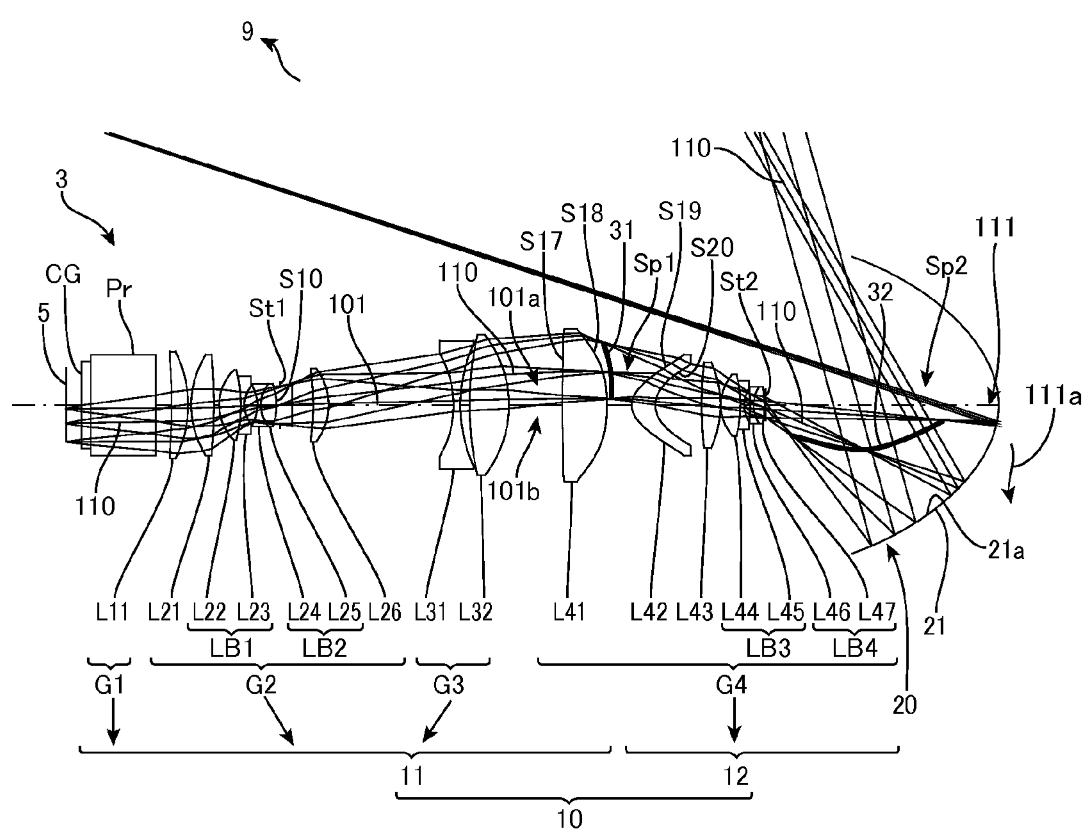
FIG. 10 shows an arrangement of a projection optical system according to a third embodiment.

FIG. 10 shows a projection optical system 3 according to a third embodiment. The projection optical system 3 is telecentric on the incident side and is capable of zooming. The projection optical system 3 includes, in order from the DMD 5 side (reducing side), the first optical system 10 that includes a plurality of lenses and the second optical system 20 that includes the first reflective surface 21*a* that reflects light emitted from the first optical system 10 to project the light onto the screen 9 on the enlargement side. The first optical system 10 includes sixteen lenses L11, L21 to L26, L31 to L32, and L41 to L47 and the second optical system 20 includes the mirror (curved mirror) 21 that has an aspherical first reflective surface 21*a*.

The first optical system 10 carries out zooming and includes, in order from the DMD 5 side, the first lens group G1 that has positive refractive power, the second lens group (former group) G2 that has positive refractive power, the third lens group (middle group) G3 that has positive refractive power and a fourth lens group (latter group) G4 that has positive refractive power. The first optical system 10 of this embodiment also forms the first intermediate image 31 that has been formed inside the first optical system 10 into the second intermediate image 32 closer to the enlargement side than the first optical system 10, and includes the first refractive optical system 11 with negative power that forms the image formed by the DMD 5 as the first intermediate image 31 and the second refractive optical system 12 with positive power that forms the first intermediate image 31 into the second intermediate image 32. The first intermediate image 31 is formed inside the fourth lens group G4 and the first lens group G1, the second lens group G2, the third lens group G3, and the first (reducing side) lens L41 of the fourth lens group G4 consist of the first refractive optical system 11 and the other lenses of the fourth lens group G4 consist of the second refractive optical system 12.

The first lens group G1 closest to the DMD 5 (i.e., closest to the reducing side) has, as a whole, positive refractive power. The first lens group G1 consists of the positive meniscus lens L11 that is convex on the enlargement side. On the DMD 5 side of the first lens group G1, a single cover glass CG made of glass and a single TIR prism Pr that is also made of glass are disposed in that order from the DMD 5 side, and the projected light from the DMD 5 enters the projection optical system 3 in a telecentric or near-telecentric state.

The second lens group (former group) G2 has, as a whole, positive refractive power. The second lens group G2 consists of a biconvex positive lens L21, a first cemented lens (balsam lens, doublet) LB1 where two lenses are stuck together, a second cemented lens LB2 where two lenses are stuck together, and a positive meniscus lens L26 that is convex on the enlargement side disposed in that order from the DMD 5 side. The first cemented lens LB1 is constructed of a biconvex positive lens L22 and a biconcave negative lens L23 that are disposed in that order from the DMD 5 side. The second cemented lens LB2 is constructed of a biconcave negative lens L24 and a biconvex positive lens L25 that are disposed in that order from the DMD 5 side. The surface on the enlargement side of the positive lens L25 is an aspherical surface. The first aperture stop St1 is disposed on the enlargement side of the positive lens L25, that is, in the space between the positive lens L25 and the positive meniscus lens L26.

The third lens group (middle group) G3 has as a whole positive refractive power. The third lens group G3 consists of a biconcave negative lens L31 and a biconvex positive lens L32 disposed in that order from the DMD 5 side.

The fourth lens group (latter group) G4 that is closest to the enlargement side has as a whole positive refractive power. The fourth lens group G4 consists of a positive meniscus lens L41 that is biconvex and made of resin, a positive meniscus lens L42 that is convex on the DMD 5 side and made of resin, a biconvex positive lens L43, a third cemented lens LB3 where two lenses are stuck together, and a fourth cemented lens LB4 where two lenses are stuck together disposed in that order from the DMD 5 side. The third cemented lens LB3 is constructed of a biconvex positive lens L44 and a biconcave negative lens L45 that are disposed in that order from the DMD 5 side. The fourth cemented lens LB4 is constructed of a biconcave negative lens L46 and a biconvex positive lens L47 that are disposed in that order from the DMD 5 side. Both surfaces of the positive meniscus lens L41, that is, the surface S17 on the reducing side and the surface S18 on the enlargement side, are aspherical surfaces. In addition, both surfaces S19 and S20 of the positive meniscus lens L42 are aspherical surfaces. The second aperture stop St2 is disposed on the enlargement side of the fourth lens group G4.

In this projection optical system 3, when zooming from the wide angle end to the telephoto end, the first lens group G1 does not move, the second lens group (former group) G2 moves from the reducing side to the enlargement side, the third lens group G3 moves from the enlargement side to the reducing side so as to compensate for the movement of the second lens group G2 so that the light flux incident on the fourth lens group G4 that is the relay lens satisfies certain conditions. The fourth lens group (latter group) G4 does not move. The projection optical system 3 is a floating focus or inner focus optical system that adjusts the focus point inside the fourth lens group G4 that does not move during zooming. Focusing in the present embodiment is carried out by moving at least one lens included in the fourth lens group G4.

The first refractive optical system 11 configured by the first to third lens groups G1 to G3 and the lens L41, is a lens system that as a whole has negative refractive power and includes a positive meniscus lens L11, a positive lens L21, a first cemented lens LB1, a second cemented lens LB2, a first stop SU, a positive meniscus lens L26, a negative lens L31, a positive lens L32, and a positive meniscus lens L41 disposed in that order from the DMD 5 side. The first intermediate image 31 is formed closer to the enlargement side than the first refractive optical system 11, that is, in a space Sp1 between the first refractive optical system 11 and the second refractive optical system 12. The first intermediate image 31 in the present embodiment is formed so as to be separated by a distance of 1.00 mm from the positive meniscus lens L41 on the enlargement side of the positive meniscus lens L41.

The second refractive optical system 12 configured by the remaining lenses L42 to L47 of the fourth lens group G4, is a lens system that as a whole has positive refractive power, and includes a positive meniscus lens L42, a positive lens L43, the third cemented lens LB3, the fourth cemented lens LB4, and the second stop St2 disposed in that order from the DMD 5 side. The second intermediate image 32 is formed closer to the enlargement side than the second refractive optical system 12, that is, in the space Sp2 between the second refractive optical system 12 and the first reflective surface 21*a*. The second intermediate image 32 according to the present embodiment is formed so as to be separated from the second aperture stop St2 by a distance of 33.80 mm on the enlargement side of the second aperture stop St2.

In the projection optical system 3 also, the first refractive optical system 11 forms the first intermediate image 31 in the space Sp1 inside the first optical system 10 and the second refractive optical system 12 forms the second intermediate image 32 in the space Sp2 that is closer to the enlargement side than the first optical system 10. In the projection optical system 3 that is telecentric on the incident side, the power of the first refractive optical system 11 is weaker than the power of the second refractive optical system 12, the first intermediate image 31 and the second intermediate image 32 are shifted toward the enlargement side compared to the projection optical system 2 that is non-telecentric, and the first intermediate image 31 and the second intermediate image 32 are respectively formed in the regions 101*a* and 101*b* on opposite sides of the optical axis 101. Accordingly, the light flux that passes the second refractive optical system 12 is further concentrated around the optical axis 101 and it is possible to make the second refractive optical system 12 much more compact.

In the projection optical system 3 also, the light rays 110 that reach the center of the second image plane of the screen 9 from the center of the first image plane formed on the DMD 5 reach the screen 9 having crossed the optical axis 101 that is common to the first optical system 10 and the second optical system 20 three times. This means that even if the enlargement side of the first optical system 10, that is, the second refractive optical system 12, is constructed by lenses that have rotational symmetry about the optical axis 101, it is possible to suppress interference with the projected light reflected by the first reflective surface 21*a* that has rotational symmetry around the optical axis 101 and it is possible to emit light rays from the first reflective surface 21*a* closer to the optical axis 101. That is, it is possible to effectively use the region close to the optical axis 101 of the first reflective surface 21*a* that has rotational symmetry, and possible to enlarge and project images with a large angle of view onto the screen 9 with a small elevation angle with respect to the optical axis 101.

In addition, since the first intermediate image 31 is formed inside the first optical system 10 and the first intermediate image 31 is formed as the second intermediate image 32 on the enlargement side of the first optical system 10, the second stop St2 for forming the second intermediate image 32 can be disposed closer to the enlargement side than the first optical system 10. Accordingly, in the projection optical system 3 also, in the same way as the projection optical system 1, it is possible to make the lens diameter on the enlargement side of the first optical system 10 smaller and to make the air gap between the first optical system 10 and the first reflective surface 21*a* smaller. This means that it is possible to provide the projection optical system 3 that is compact and can project wider angle.

Also in this projection optical system 3, the first refractive optical system 11 corrects various aberrations such as curvature of field, astigmatism, and comatic aberration and the second refractive optical system 12 corrects distortion such as keystone distortion, the system 3 has high performance, and is capable of zooming. In the first optical system 10, both surfaces S17 and S18 of the positive lens L41 that is biconvex, is made of resin, and is closest to the enlargement side of the first refractive optical system 11 are aspherical surfaces, and it is possible to sharply form the first intermediate image 31 produced by enlarging the image formed by the DMD 5. Both surfaces S19 and S20 of the positive meniscus lens L42 that is convex on the reducing side and is disposed closest to the reducing side of the second refractive optical system 12 have small radii of curvature (that is, a large curvature), and the surface S20 on the mirror 21 side has the next smallest radius of curvature after the surface S19 (that is, a large curvature). This means that this optical system makes it easy to form the first intermediate image 31 that is formed so as to be slightly inclined toward the reducing side into the second intermediate image 32 that has keystone distortion. Accordingly, it is possible to project an image which is sharp and in which keystone distortion has been corrected onto the screen 9.

The effective diameter of the positive lens L41 of the first refractive optical system 11 is 49.0 mm and is the lens that gives the maximum effective diameter of the first refractive optical system 11 and the first optical system 10. The effective diameter of the positive lens L47 that is closest to the enlargement side of the second refractive optical system 12 is 11.0 mm in the present embodiment and is smaller than the maximum effective diameter of the first refractive optical system 11. In addition, the effective diameter of the positive meniscus lens L42 that gives the maximum effective diameter of the second refractive optical system 12 is 32.0 mm and the maximum effective diameter of the second refractive optical system 12 is smaller than the maximum effective diameter of the first refractive optical system 11.

Since the second refractive optical system 12 of this system also forms the first intermediate image 31 that has little distortion as the second intermediate image 32 that is inverted in the up-down and left-right directions, it is possible to provide the projection optical system 3 that facilitates formation of the second intermediate image 32 that has keystone distortion while cutting out scattered light (unneeded light) and is also capable of projecting, onto the screen 9, a sharp and enlarged image in which keystone distortion is effectively cancelled out.

FIG. 11 shows lens data of the various lenses of the first optical system 10 of the projection optical system 3. FIG. 12 shows various numeric values of the projection optical system 3. In the present embodiment, since the optical distance d1 of the second intermediate image 32 on the optical axis 101 from the second stop St2 is 59.00 mm and the optical distance d2 of the closest periphery (closest edge) of the second intermediate image 32 from the second stop St2 is 8.50 mm, the shown position of the second intermediate image 32 is calculated as a position 33.80 mm from the second stop St2. Note that the distances varied during zooming V1-V3 indicate the air gaps between the first lens group G1 and the second lens group G2, the second lens group G2 and the third lens group G3, and the third lens group G3 and the fourth lens group G4, respectively. FIG. 13 shows the light flux on planes in the peripheries of the first intermediate image 31 and the second intermediate image 32 of the projection optical system 3.

For the projection optical system 3, Conditions (1) to (5) described above are as shown below.

$$EXP/dw=0.34 \quad \text{Condition (1)}$$

$$dn/dw=0.25 \quad \text{Condition (2)}$$

$$MD/ID=3.8 \quad \text{Condition (3)}$$

$$LLD/ID=0.4 \quad \text{Condition (4)}$$

$STD2/MD=9.2$ Condition (5)

Accordingly, the projection optical system 3 according to the present embodiment satisfies Conditions (1) to (5).

By being configured of the sixteen lenses L11, L21 to L26, L31 to L32, and L41 to L47 and the single mirror 21, the projection optical system 3 according to the third embodiment is a high performance, telecentric projection optical system that is comparatively bright with an F number of 2.43, is capable of zooming, is wide angle with a maximum angle of view (full angle) of 75.32 degrees and a focal distance of 3.46 at the wide-angle end, and is capable of projecting sharp images.

Note that the present invention is not limited to such embodiments and is defined by the scope of the claims. The optical systems described above are examples and the surfaces of the lenses and/or the mirror surface (reflective surface) included in the projection optical system may be spherical surfaces or aspherical surfaces with rotational symmetry or may be asymmetrical surfaces, for example, free-form surfaces. At least one of the lenses included in the first optical system and/or the reflective surface included in the second optical system may be off-center from the optical axis. In this case, the optical axes of the respective optical systems include the optical axes of the main optical elements. Also, the optical axis of the first optical system and the optical axis of the second optical system may be the same or may be off-center (shifted). The light valve 5 may be a three panel-type light modifier 5 that splits a white light source into three colors using a dichroic filter (mirror) or the like, and the light modifier 5 may be an LCD (liquid crystal panel), a self-luminous organic EL, or the like. The first optical system 10 and the second optical system 20 may further include a prism or mirror that bends the optical path. For example, it is possible to dispose one or a plurality of mirrors or prisms on the reducing side or the enlargement side of the first reflective surface 21*a*. It is also possible to further include a refractive optical system on the enlargement side of the second optical system 20.

The invention claimed is:

1. A projection optical system that projects from a first image plane on a reducing side to a second image plane on an enlargement side, comprising:

a first optical system including a first refractive optical system and a second refractive optical system, the first refractive optical system including a plurality of lenses and forms light incident from the reducing side into a first intermediate image on the enlargement side, the second refractive optical system including a plurality of lenses and forms the first intermediate image on the reducing side into a second intermediate image on the enlargement side;

a first reflective optical system that includes a first reflective surface with positive refractive power that is positioned closer to the enlargement side than the second intermediate image;

a first stop disposed between the first image plane and the first intermediate image; and a second stop disposed between the first intermediate image and the second intermediate image, and wherein an optical distance EXP between an exit pupil and the first reflective surface when the first stop is a stop of the first optical system and an optical distance dw between the first image plane and the first reflective surface satisfy the following condition $0.1<EXP/dw<0.6.$

2. The projection optical system according to claim 1, wherein the first refractive optical system forms an image formed on the first image plane into the first intermediate image, and a light ray that reaches a center of the second image plane from a center of the first image plane reaches the second image plane having crossed any of an optical axis of the first refractive optical system, an optical axis of the second refractive optical system, and an optical axis of the first reflective optical system three times.

3. The projection optical system according to claim 1, wherein the first image plane and the first reflective surface are disposed in a same side with respect to a first plane that includes an optical axis.

4. The projection optical system according to claim 1, wherein an effective diameter of a lens that is closest to the enlargement side of the second refractive optical system is smaller than a maximum effective diameter of the first refractive optical system.

5. The projection optical system according to claim 1, wherein a maximum effective diameter of the second refractive optical system is smaller than a maximum effective diameter of the first refractive optical system.

6. The projection optical system according to claim 1, wherein the first refractive optical system is an equal magnification or a magnifying optical system.

7. The projection optical system according to claim 1, wherein the second stop is an eccentric stop.

8. The projection optical system according to claim 1, wherein the first intermediate image and the second intermediate image are formed on opposite sides of the optical axis.

9. The projection optical system according to claim 1, wherein the first optical system includes a zoom optical system.

10. The projection optical system according to claim 9, wherein the first optical system includes, in order from the reducing side, a former group with positive refractive power, a middle group with positive refractive power, and a latter group with positive refractive power, and when zooming from a wide angle end to a telephoto end, the former group moves from the reducing side to the enlargement side, the middle group moves so as to compensate for movement of the former group, and the latter group is fixed, and the first intermediate image is formed inside the latter group.

11. A projector comprising:

the projection optical system according to claim 1; and a light modulator that forms an image on the first image plane.

12. The projector according to claim 11, further comprising an illuminating optical system that illuminates the first image plane and is disposed in a same side as the first reflective surface with respect to a first plane that includes the optical axis.

13. A projection optical system that projects from a first image plane on a reducing side to a second image plane on an enlargement side, comprising:

a first refractive optical system that includes a plurality of lenses and forms light incident from the reducing side into a first intermediate image on the enlargement side;

a second refractive optical system that includes a plurality of lenses and forms the first intermediate image on the reducing side into a second intermediate image on the enlargement side; and a first reflective optical system that includes a first reflective surface with positive refractive power that is positioned closer to the enlargement side than the second intermediate image;

wherein an optical distance do between the lens closest to the enlargement side of the second refractive optical system and the first reflective surface and an optical distance dw between the first image plane and the first reflective surface satisfy the following condition $$0.1<dn/dw<0.3.$$

14. The projection optical system according to claim 13, wherein the first refractive optical system forms an image formed on the first image plane into the first intermediate image, and a light ray that reaches a center of the second image plane from a center of the first image plane reaches the second image plane having crossed any of an optical axis of the first refractive optical system, an optical axis of the second refractive optical system, and an optical axis of the first reflective optical system three times.

15. The projection optical system according to claim 13, wherein the first image plane and the first reflective surface are disposed in a same side with respect to a first plane that includes an optical axis.

16. The projection optical system according to claim 13, wherein an effective diameter of a lens that is closest to the enlargement side of the second refractive optical system is smaller than a maximum effective diameter of the first refractive optical system.

17. The projection optical system according to claim 13, wherein the first intermediate image and the second intermediate image are formed on opposite sides of an optical axis.

18. The projection optical system according to claim 13, further comprising a first optical system including the first refractive optical system and the second refractive optical system, and wherein the first optical system includes a zoom optical system.

19. A projector comprising:

the projection optical system according to claim 13; and a light modulator that forms an image on the first image plane.

20. The projector according to claim 19, further comprising an illuminating optical system that illuminates the first image plane and is disposed in a same side as the first reflective surface with respect to a first plane that includes the optical axis.

* * * * *